(12) United States Patent
Rocherolle et al.

(10) Patent No.: US 12,147,641 B2
(45) Date of Patent: Nov. 19, 2024

(54) DATA ENTRY FOR AN APPLICATION

(71) Applicant: START PROJECT, LLC, Corte Madera, CA (US)

(72) Inventors: Narendra Rocherolle, Mill Valley, CA (US); Nicholas Wilder, Boulder, CO (US); Julie Davidson Rocherolle, Mill Valley, CA (US)

(73) Assignee: START PROJECT, LLC, Corte Madera, CA (US)

( * ) Notice: Subject to any disclaimer, the term of this patent is extended or adjusted under 35 U.S.C. 154(b) by 0 days.

(21) Appl. No.: 18/298,323

(22) Filed: Apr. 10, 2023

(65) Prior Publication Data

US 2023/0259247 A1 Aug. 17, 2023

Related U.S. Application Data

(63) Continuation of application No. 16/706,881, filed on Dec. 9, 2019, now Pat. No. 11,625,137, which is a
(Continued)

(51) Int. Cl.
*G06F 3/0481* (2022.01)
*G06F 3/04842* (2022.01)
(Continued)

(52) U.S. Cl.
CPC ........ *G06F 3/0481* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS 6,047,259 A * 4/2000 Campbell .............. G16H 15/00
705/2
6,175,831 B1 1/2001 Weinreich
(Continued)

OTHER PUBLICATIONS

"Migrating Data to Oracle Content Management SDK" Oracle, pp. 1-16, 2002. (16 pgs).
(Continued)

*Primary Examiner* — Haimei Jiang
(74) *Attorney, Agent, or Firm* — BAUGH LAW, LLC

(57) ABSTRACT

Disclosed are embodiments of systems and methods that allow for simplified entry of data. In one or more embodiments, an entry may be provided via a simplified entry form. Embodiments simplify data entry using natural language parsing. Embodiments may enable creation of an event for a calendaring application and/or within an application that is not primarily a calendaring application. Also disclosed are embodiments of systems and methods that allow for robust, flexible, secure, and efficient network and/or data file management. In one or more embodiments, items may be associated with labels, tags, or other identifiers, third parties may be associated with labels, tags, or other identifiers, and sharing with the third party may be based upon comparisons of the labels, tags, or other identifiers associated with the items and the labels, tags, or other identifiers associated with the third parties.

20 Claims, 24 Drawing Sheets

Related U.S. Application Data continuation of application No. 15/069,676, filed on Mar. 14, 2016, now Pat. No. 10,503,345, which is a continuation of application No. 12/011,314, filed on Jan. 25, 2008, now Pat. No. 9,286,935.

(60) Provisional application No. 60/888,073, filed on Feb. 2, 2007, provisional application No. 60/887,797, filed on Feb. 1, 2007, provisional application No. 60/887,140, filed on Jan. 29, 2007.

(51) Int. Cl.
   *G06F 3/04847*   (2022.01)
   *G06F 40/134*   (2020.01)
   *G06F 40/166*   (2020.01)
   *G06F 40/211*   (2020.01)
   *G06F 40/284*   (2020.01)
   *G06Q 10/10*   (2023.01)
   *G11B 20/12*   (2006.01)

(52) U.S. Cl.
   CPC .......... *G06F 40/134* (2020.01); *G06F 40/166* (2020.01); *G06F 40/211* (2020.01); *G06F 40/284* (2020.01); *G06Q 10/10* (2013.01); *G11B 20/1217* (2013.01)

(56) References Cited

U.S. PATENT DOCUMENTS

| | | | |
|---|---|---|---|
| 6,262,735 B1* | 7/2001 | Etelapera | G06F 3/0489 715/854 |
| 6,571,245 B2 | 5/2003 | Huang | |
| 6,820,204 B1 | 11/2004 | Desai | |
| 7,069,308 B2 | 6/2006 | Abrams | |
| 7,091,959 B1* | 8/2006 | Clary | G06F 3/03545 345/173 |
| 7,146,381 B1* | 12/2006 | Allen | G06F 40/205 706/14 |
| 7,174,517 B2 | 2/2007 | Barnett | |
| 7,370,282 B2* | 5/2008 | Cary | G06Q 10/109 715/963 |
| 7,421,660 B2* | 9/2008 | Charnock | G06F 16/358 715/753 |
| 7,571,108 B1* | 8/2009 | Leban | G06Q 10/06316 705/7.26 |
| 7,739,597 B2 | 6/2010 | Wong | |
| 7,747,639 B2* | 6/2010 | Kasperski | G06F 16/951 707/765 |
| 7,757,176 B2 | 7/2010 | Vakil | |
| 8,713,418 B2* | 4/2014 | King | G06F 16/334 715/255 |
| 2001/0013043 A1* | 8/2001 | Wagner | G06F 40/221 715/229 |
| 2001/0014859 A1* | 8/2001 | Itoh | G10L 15/197 704/260 |
| 2002/0044687 A1* | 4/2002 | Federman | G06F 40/174 382/187 |
| 2002/0078007 A1 | 6/2002 | Herrero | |
| 2002/0089551 A1 | 7/2002 | Hugh | |
| 2002/0193995 A1* | 12/2002 | Case | G10L 13/06 704/260 |
| 2003/0033296 A1 | 2/2003 | Rothmuller | |
| 2003/0110169 A1 | 6/2003 | Zuili | |
| 2003/0120684 A1 | 6/2003 | Zuil | |
| 2003/0154116 A1 | 8/2003 | Lofton | |
| 2003/0167279 A1 | 9/2003 | Smiga | |
| 2004/0103367 A1* | 5/2004 | Riss | G06V 30/1444 715/234 |
| 2004/0148275 A1 | 7/2004 | Achlioptas | |
| 2005/0070255 A1* | 3/2005 | Cass | H04M 3/42 455/412.2 |
| 2005/0076037 A1* | 4/2005 | Shen | G06Q 10/107 |
| 2005/0108267 A1* | 5/2005 | Gibson | G06F 16/258 |
| 2005/0216300 A1 | 9/2005 | Appelman | |
| 2005/0216550 A1 | 9/2005 | Paseman | |
| 2005/0222971 A1* | 10/2005 | Cary | G06Q 10/109 |
| 2005/0246316 A1* | 11/2005 | Lawson | G16C 20/70 |
| 2006/0047632 A1* | 3/2006 | Zhang | G06F 16/367 |
| 2006/0135264 A1 | 6/2006 | Shaw | |
| 2006/0143157 A1* | 6/2006 | Landsman | G06Q 10/10 |
| 2006/0230043 A1 | 10/2006 | Sunmer-Moore | |
| 2006/0242581 A1 | 10/2006 | Manion | |
| 2007/0055656 A1* | 3/2007 | Tunstall-Pedoe | G06N 5/00 |
| 2007/0073694 A1 | 3/2007 | Picault | |
| 2007/0083552 A1* | 4/2007 | Allen | G06F 40/205 |
| 2007/0156522 A1 | 7/2007 | Carpenter | |
| 2007/0156912 A1 | 7/2007 | Crawford | |
| 2007/0173325 A1 | 7/2007 | Shaw | |
| 2007/0218900 A1 | 9/2007 | Abhyanker | |
| 2007/0219773 A1* | 9/2007 | Roux | G06F 40/237 704/1 |
| 2007/0219950 A1 | 9/2007 | Crawford | |
| 2007/0220063 A1* | 9/2007 | O'Farrell | G06F 40/284 |
| 2007/0282595 A1* | 12/2007 | Tunning | G06F 16/3329 704/9 |
| 2008/0027893 A1* | 1/2008 | Cavestro | G06F 16/313 707/E17.084 |
| 2008/0077888 A1* | 3/2008 | Miksovsky | G06Q 10/109 368/29 |
| 2008/0140384 A1* | 6/2008 | Landau | G06F 40/20 704/9 |
| 2009/0319295 A1* | 12/2009 | Kass-Hout | G16H 50/80 707/999.102 |
| 2010/0015975 A1 | 1/2010 | Issa | |

OTHER PUBLICATIONS

"Who Sees Your Calendar?" Computing at Cornell [online]. Last modified May 25, 2007 [Retrieved on Sep. 2, 2008]. Retrieved from the Internet: <URL: www.cit.cornell.edu/calendar/howto/access>. (5pgs).

* cited by examiner

Add An Event

100

| | |
|---|---|
| Time Zone: | Pacific Standard Time _/105 |
| Event: | _____ _/110 |
| Event Type: | Appointment _/115 |
| Event Date: | January 2 2007 _/120 |
| Time: | ⊗ Start: 1pm 00   ○ ALL Day _/125 |
| | Stop: 2pm 00 |
| 135 — Place: | _____ |
| 140 — Notes: | _____ |
| 145 — Sharing: | ⊗ Private   ○ Public |
| 150 — Repeat: | ○ Repeat Every Day |
| | ○ Repeat on the First Sun of the month |
| | ⊗ No repeat |
| | End Date: |
| | ⊗ No End Date. |
| | ○ Until January 3 2007 |
| 160 — Invite: | Enter the email addresses: |
| | _____ |
| 165 — Reminders: | ○ Do not send a reminder. |
| | ⊗ Remind 15 minutes before the event. |

DATA ENTRY FOR AN APPLICATION

CROSS-REFERENCE TO RELATED APPLICATIONS

This application is a continuation of and claims the priority benefit under 35 U.S.C. § 120 to commonly-assigned and co-pending U.S. patent application Ser. No. 16/706,881, entitled "SIMPLIFIED DATA ENTRY," listing Narendra Rocherolle, Nicholas Wilder, and Julie Davidson Rocherolle as inventors and filed on Dec. 9, 2019, which issued as U.S. Pat. No. 11,625,137 on Apr. 11, 2023, which is a continuation of and claims the priority benefit under 35 U.S.C. § 120 to commonly-assigned U.S. patent application Ser. No. 15/069,676, entitled "SIMPLIFIED CALENDAR EVENT CREATION," listing Nicholas Wilder, Narendra Rocherolle, and Julie Davidson Rocherolle as inventors and filed on Mar. 14, 2016, which issued as U.S. Pat. No. 10,503,345 on Dec. 10, 2019, which is a continuation of and claims the priority benefit under 35 U.S.C. § 120 to U.S. patent application Ser. No. 12/011,314, entitled "SIMPLIFIED DATA ENTRY," listing Nicholas Wilder, Narendra Rocherolle, and Julie Davidson Rocherolle as inventors and filed on Jan. 25, 2008, which issued as U.S. Pat. No. 9,286,935 on Mar. 15, 2016, which claimed priority under 35 U.S.C. § 119(e) to: (1) U.S. Provisional Patent Appl. No. 60/887,140, entitled "SYSTEMS AND METHODS FOR SIMPLIFIED EVENT ENTRY," filed Jan. 29, 2007; (2) U.S. Provisional Patent Appl. No. 60/887,797, entitled "TAG SHARING," filed Feb. 1, 2007; and (3) U.S. Provisional Patent Appl. No. 60/888,073, entitled "PROFILE GENERATION, USE, AND MANAGEMENT," filed Feb. 2, 2007. Each of the aforementioned patent documents is incorporated by reference herein in its entirety and for all purposes.

This application is related to commonly-assigned U.S. patent application Ser. No. 15/134,079, entitled "CONTENT SHARING," listing Nicholas Wilder, Narendra Rocherolle, and Julie Davidson Rocherolle as inventors and filed on Apr. 20, 2016, which issued as U.S. Pat. No. 10,073,865 on Sep. 11, 2018, which is a continuation of and claims the priority benefit under 35 U.S.C. § 120 to commonly-assigned U.S. patent application Ser. No. 13/411,317, entitled "CONTENT SHARING," listing Nicholas Wilder, Narendra Rocherolle, and Julie Davidson Rocherolle as inventors and filed on Mar. 2, 2012, which issued as U.S. Pat. No. 9,336,276 on May 10, 2016, which is a continuation application of and claims priority under 35 USC § 120 to commonly-assigned U.S. patent application Ser. No. 12/020,446, entitled "CONTENT SHARING USING METADATA," listing Nicholas Wilder, Narendra Rocherolle, and Julie Davidson Rocherolle as inventors and filed on Jan. 25, 2008, which issued as U.S. Pat. No. 8,161,069 on Apr. 17, 2012, which claimed priority under 35 USC § 119(e) to U.S. Provisional Application Ser. No. 60/887,797, entitled "TAG SHARING," filed Feb. 1, 2007. Each of the aforementioned patent documents is incorporated by reference herein in its entirety.

This application is related to commonly-assigned U.S. patent application Ser. No. 12/011,400, entitled "PROFILE GENERATION, USE, AND MANAGEMENT," listing Nicholas Wilder, Narendra Rocherolle, and Julie Davidson Rocherolle as inventors and filed on Jan. 25, 2008, which issued as U.S. Pat. No. 9,094,469 on Jul. 28, 2015, which claimed priority under 35 USC § 119(e) to U.S. Provisional Application Ser. No. 60/888,073, entitled "Profile Generation, Use, and Management," filed Feb. 2, 2007; each of the aforementioned patent documents is incorporated by reference herein in its entirety.

BACKGROUND

A. Technical Field

The present invention pertains generally to user interfaces and data, and relates more particularly to systems and methods for data entry.

B. Background of the Invention

The creation of events for a calendar application, whether that application is a desktop application or a networked application typically involved long and detailed forms in order to populate many database fields used to describe a typical event.

FIG. 1 depicts an example of a typical interface provided to users to enter event information into a calendar application. The design of the entry interface 100 requires a user to enter numerous pieces of information and respond to a number of questions. For example, the interface 100 has the user select the time zone 105, enter an event description or event summary 110, and classify the event 115. Then, the user must specify the time 125, date 120, and location 135 of the event. Additional data fields that include sections for notes 140, sharing 145, event repeat information 150, invitations to the event 160, and reminders 165 are also provided. Interface 100 may also include even more fields that may be required or provided to a user but are not shown 170 in FIG. 1.

Interfaces such as the one illustrated in FIG. 1 are almost universally employed because they are easy to implement. However, such interfaces are typically so vast that they consume an entire screen view. Sometime the interface can exceed a single screen view, which requires the user to scroll to the additional section. In some instances, the interface may span more than one page, which requires a user to move to another page or pages to view and complete the remainder of the entry.

Although these interfaces may be easy to implement for a programmer or applications developer, they can be inefficient and time consumer for the users who must traverse them just to enter an event. Accordingly, what is needed are systems and methods for entering event data that are more efficient and better suited for users than traditional event entry interfaces.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 1 depicts, for purposes of illustration, an example of an interface provided to a user to input a calendar event.

DETAILED DESCRIPTION OF THE PREFERRED EMBODIMENTS

Figure 2:
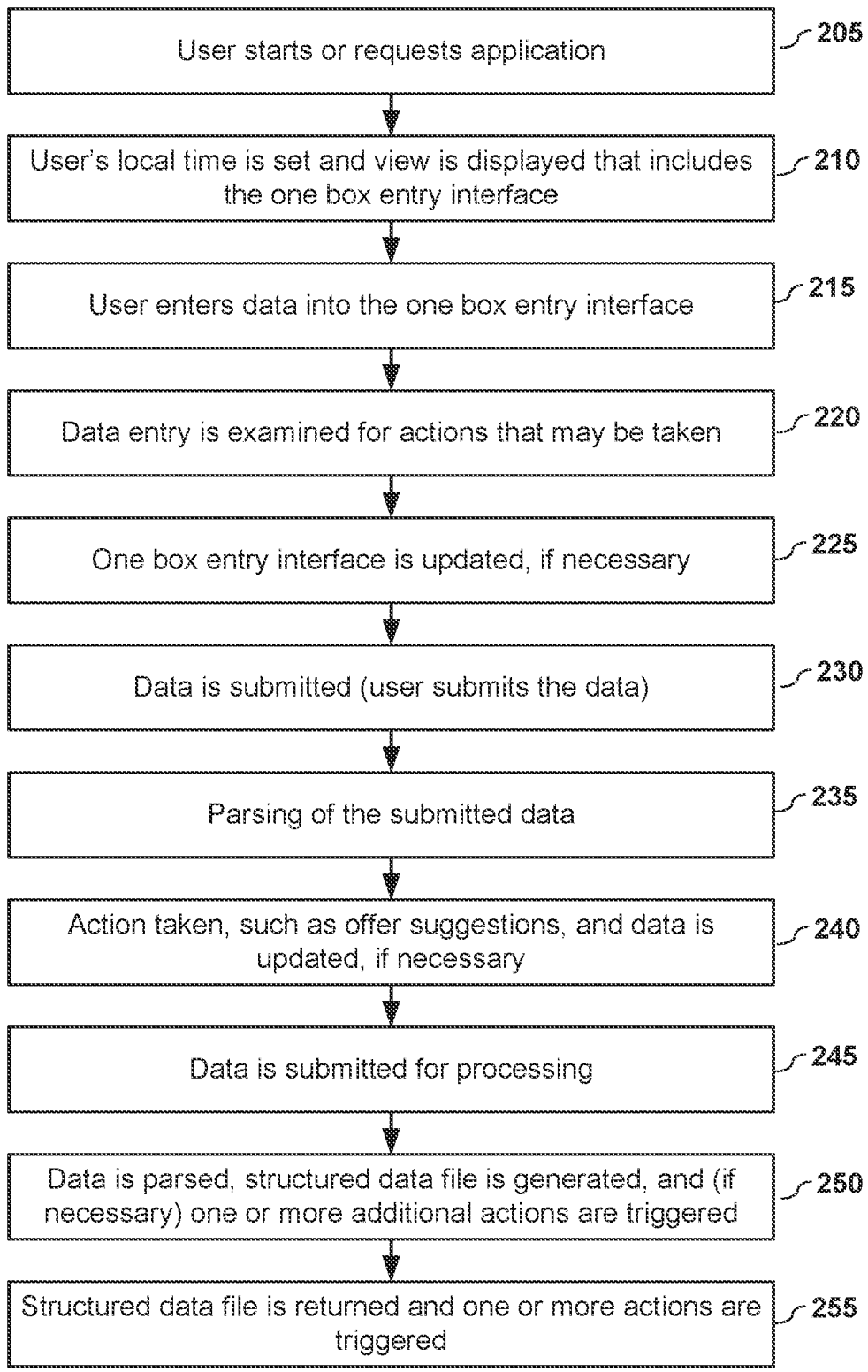
FIG. 2 depicts a methodology for providing a single interface (one box entry interface) for event entry according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. Embodiments of Data Entry

Aspects of the present invention relate to systems and methods for providing concise entry of information into an application, such as a calendaring application. In one or more embodiments, an entry may be provided via a single entry interface, which may be referred to herein as a "one box" entry. In one or more embodiments, the present invention simplifies the creation of an event through parsing, fixed or suggested formats, reserved syntax, contextual information, display logic, or combinations thereof. In one or more embodiments, an event may be a new calendar event, which may comprise several database fields including, but not limited to: summary, start date/time, end date/time, notes, invitees, location, tags, privacy setting, repeat pattern, reminder setting, and attached documents. Embodiments of the present disclosure may also simplify or streamline the entry process by enabling or triggering actions related to the event. Embodiments of the present disclosures may include the creation of an event by traditional web post, ajax web post, email, SMS/text messaging, instant messaging (IM), and/or desktop or embedded widgets.

FIG. 2 depicts a methodology for processing an event entry according to embodiments of the present disclosure. It shall be noted that the method presented in FIG. 2 is an embodiment of a method that may be performed according to the teachings of the present disclosure; accordingly, one skilled in the art shall recognize that steps may be added, removed, and/or reordered. The method illustrated in FIG. 2 may be embodied in an application, which may be a calendaring application. In one or more embodiments, the application may operate on a single device. In alterative embodiments, the application may be a distributed application and operate on more than one device. In one or more embodiments, the application may be an Internet application, wherein a user interfaces with the application through a web browser.

Returning to FIG. 2, a user may initiate a request (205) to access an application, which may be a calendaring application. In one or more embodiments, the user may enter a web address (e.g., a Uniform Resource Locator (URL) for a web service, such as 30Boxes), which initiates a server request. When the application launches (which shall be understood to include displaying a web page), the user's local time (ULT) may be set. For example, in one or more embodiments, the user's local time information may be obtained from the computer system on which the user is accessing the application. In one or more embodiments, the user's local time information may be stored in an account profile; or alternatively, the user's local time information may be deduced from the time zone of the browser making the request of the server. In one or more embodiments, upon loading the web site, if the server recognizes a logged-in user at the client, but does not know the user's time zone, the server 1130 may send to the client 1125 a small page that contains javascript code to determine the user's time zone and send that information to the server. The time zone may then be stored in a browser cookie for a period of time.

Figure 3:
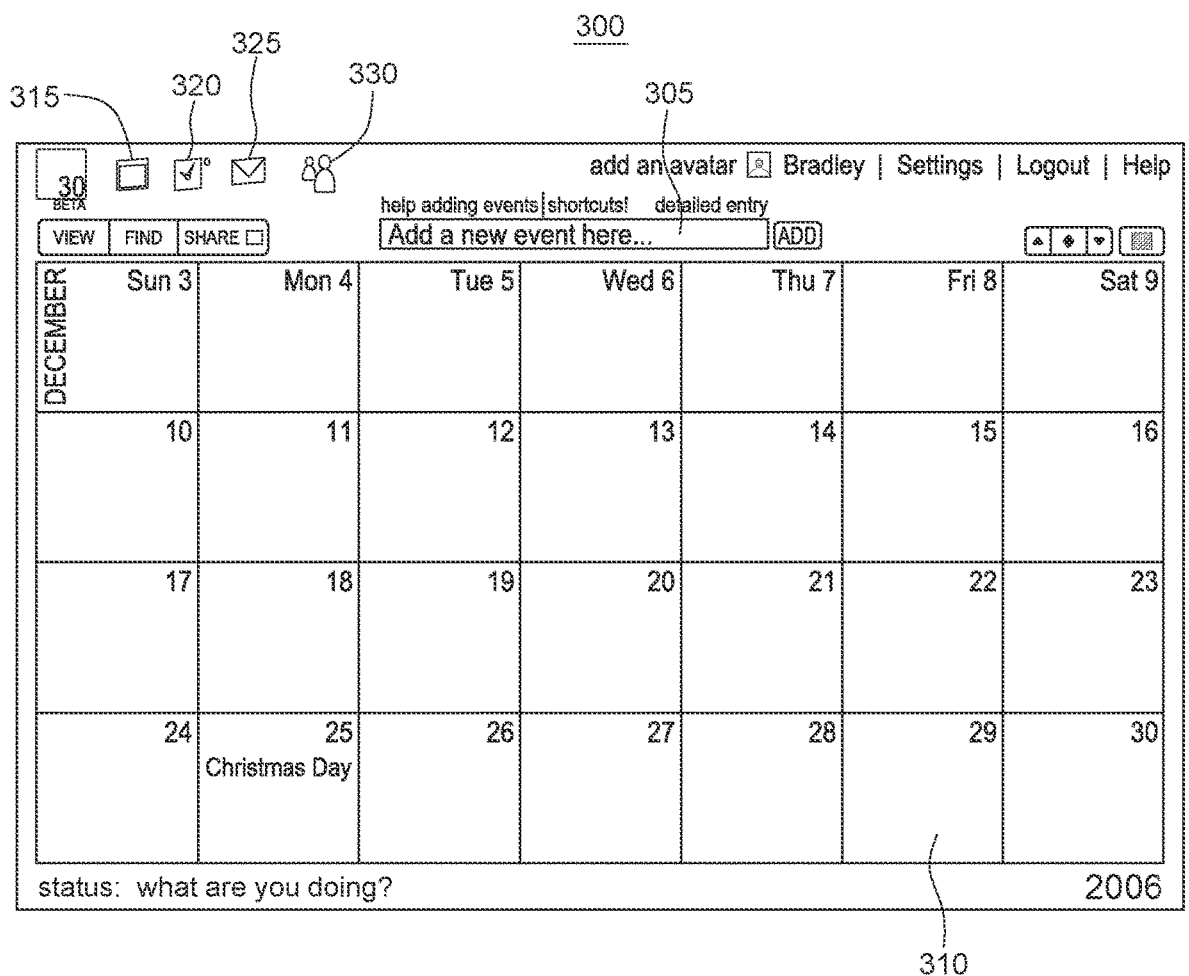
FIG. 3 depicts a calendar application interface with a one box entry interface according to embodiments of the present disclosure.

Once loaded, a view with a single entry interface may be displayed (210) to the user. FIG. 3 depicts a view 300 with an interface 305 for entering information according to embodiments of the present disclosure. In the embodiment depicted in FIG. 3, the entry interface 305 comprises a single entry box that may be used in conjunction with a calendar application to enter an event. In one or more embodiments, the view may display or include links to additional items or functions. For example, calendar interface 300 displays the user's calendar 310 and links to other functional sections of the application, such as a link 320 to a task management section, a link 325 to a communications section, and a link 330 to contacts or buddies.

The depicted embodiment also includes a link 315 to the calendar section of the application. In one or more embodiments, selection of the link 315 may cause a primary view of the calendar to be displayed to the user. For the purposes of illustration, a primary view referred to herein will be a month view or four-week view 310.

Figure 4:
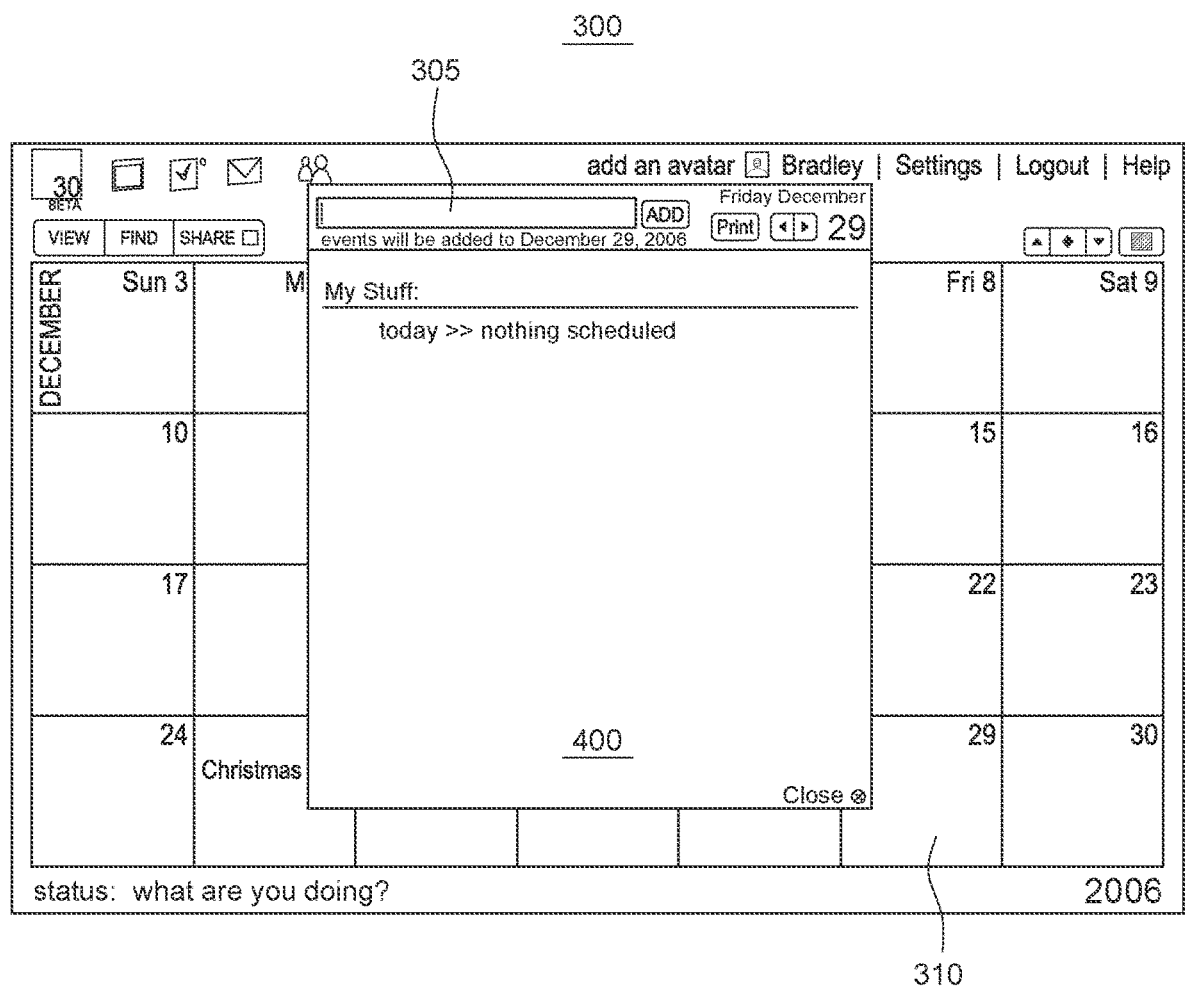
FIG. 4 depicts an alternative calendar application interface with a one box entry interface according to embodiments of the present disclosure.

FIG. 4 depicts an alternative view or interface, which view is a day view 400. In the depicted embodiment, the day view 400 may be superimposed over the primary view 310. However, it shall be noted that the primary view may be a different view such as, for example, one or more years, one or more months, one or more weeks, one or more days, fractional parts of any of the foregoing, or any combination thereof. In one or more embodiments, the primary view may be user-selected.

A user may add an event to the calendar application by inputting (215) data into the one box interface 305. In one or more embodiments, the calendar application may use parsing, fixed or suggested formats, reserved syntax, contextual information, natural language logic, display logic, or combinations thereof to ascertain information regarding an event. For purposes of illustration various embodiment and examples are provided below.

In one or more embodiments, data entered into the one box entry interface 305 may be examined (220) to determine if an action or actions may be taken. In one embodiment, each keystroke of the user inputted data may be examined for specific syntax or contextual clues. These specific sets of syntax and clues may be referred to herein as being part of pre-set data, readily-identified data, or triggers. In one or more embodiments, syntax clues may be a reserved word, text format, or character used to help determine meaning or action when parsing. It shall be understood that the use of the term "words," "clue," or "text" shall be understood to mean any symbol which may be entered by a user or any combination thereof, regardless of whether any such inputted symbol or collection of inputted symbols form a commonly readable or identified "word" or "text." In one or more embodiments, the inputted data may be parsed and may be compared against one or more sets of pre-set data, such as a set of syntax and/or contextual formats.

If data conforming to a specific syntax or a contextual clue is identified, an action may be taken. Examples of actions include, but are not limited to, prompting the user for additional information, providing additional information to the user, and/or initiating action with a third party (person, application, device, and/or system).

Figure 5:
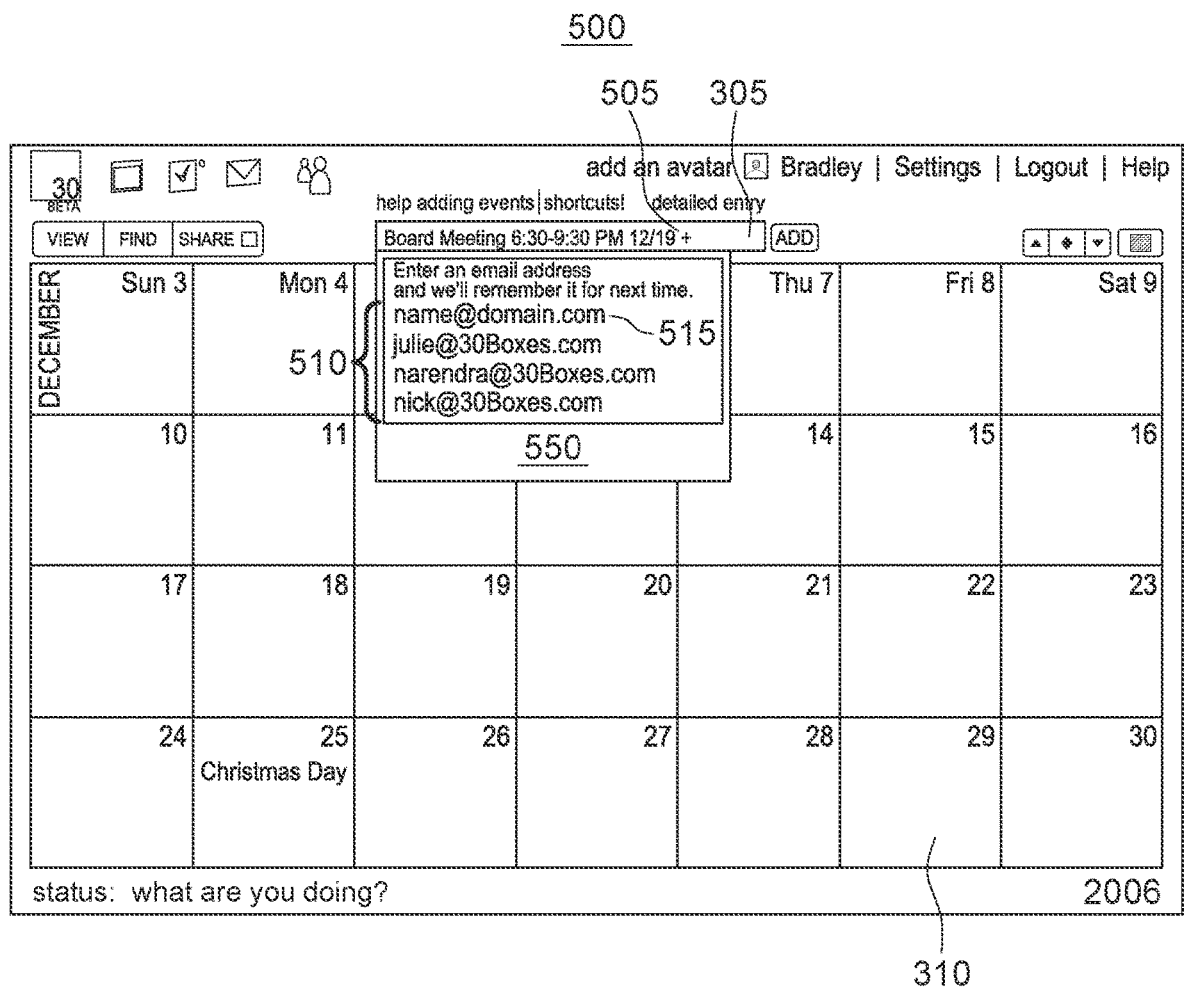
FIG. 5 depicts a one box entry wherein the one box entry interface provides additional prompts to a user according to embodiments of the present disclosure.

Consider, by way of illustration, the example depicted in FIG. 5. FIG. 5 depicts a calendar interface 500, in which a user has started to enter an event. The user has inputted the data: "Board Meeting 6:30-9:30 PM 12/19+". In one or more embodiments, even before the user has submitted the event, examination and identification of the symbol "+" may trigger the action of altering the interface 500 by displaying a window 550 with a list of potential invitees 510. That is, in one or more embodiments, data wizards may operate in conjunction with the one box entry interface to provide prompts to the user. In one or more embodiments, keywords, context words, and/or set syntax may be used as triggers that initiate the data wizard prompts. In the example depicted in FIG. 5, the use of the "+" symbol triggered an invitation prompt. Rather than requiring the user to enter email addresses, the user enters the "+" symbol and may then select one or more email addresses from a pre-populated list. In one or more embodiments, the pre-populated list may be obtained from the user's contacts/buddies. If the email is not included, the user may add the email address and it will be displayed the next time the invitation data wizard is triggered. In one or more embodiments, one or more of the data wizards may be dynamic. For example, a data wizard may cause an external email address book to be loaded via Ajax to obtain access to email addresses. Thus, it shall be noted that an aspect of the present invention includes monitoring for certain symbols or combinations of symbols that invoke shortcuts to data entry.

Figure 12:
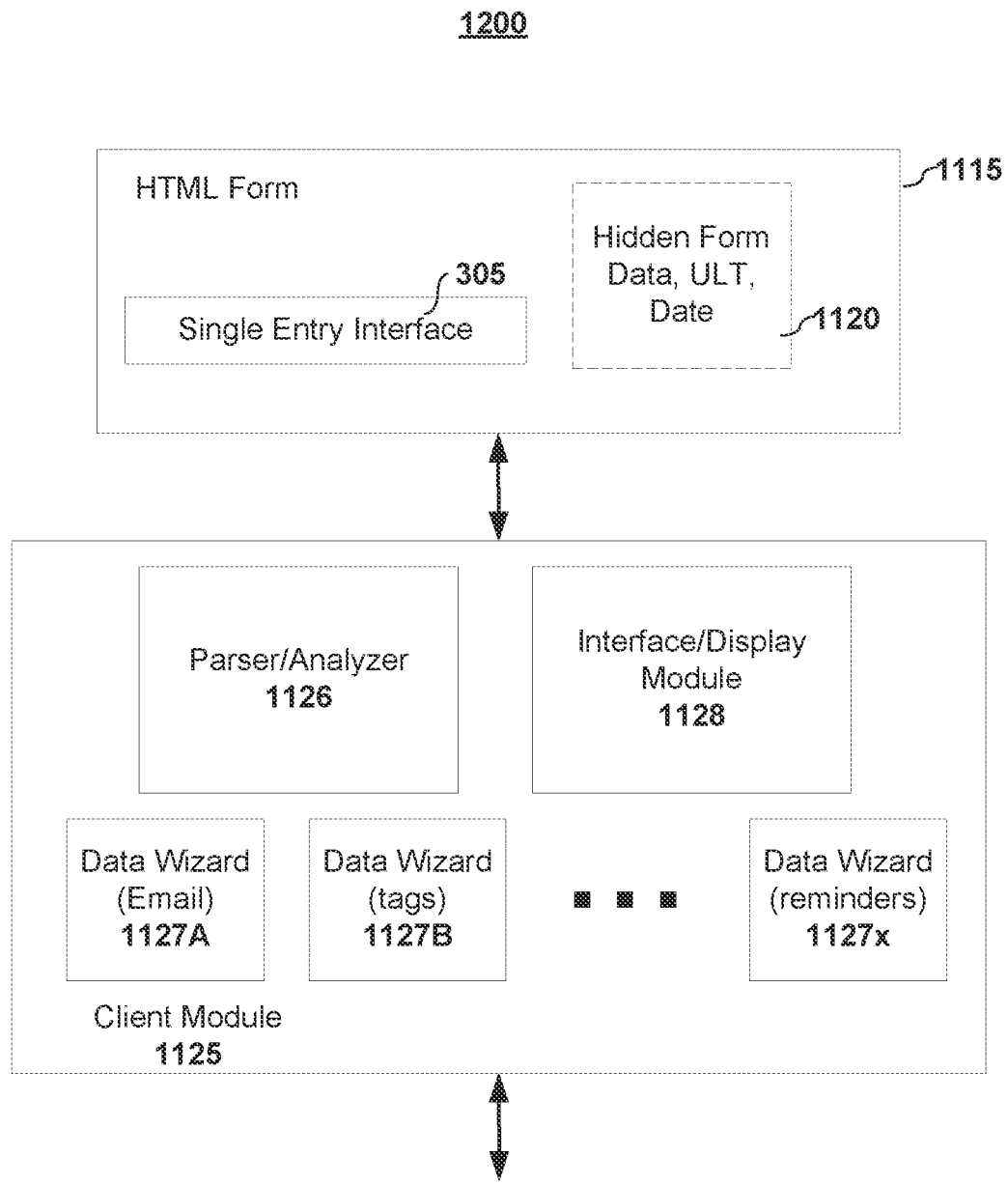
FIG. 12 depicts a client module according to embodiments of the present disclosure.

In the embodiment depicted in FIG. 12, the data wizards 1127 may reside on a client module 1125. The client 1125 may include client-side logic functions that determine when an action should be taken based upon the inputted data and triggers an appropriate data wizard or wizards 1127. Examples of data wizards include, but are not limited to email addresses 1127A, tags 1127B, to do lists (not shown), repeats (not shown), and reminders 1127x. In one or more embodiments, data wizards may comprise blocks of HTML and javascript that facilitate the selection of certain options related to event creation and trigger either a string of post-pended text to an input form element or the creation of a hidden form element.

Examples of pre-set/readily-identifiable data, such as syntax or context clues, that may invoke prompts or data wizards may include, but are not limited to:

1) the word "tag" followed by a space may trigger a drop-down list of the user's list of tags (if any) by which the user may classify the event with one or more tags, such as, work, family, volunteer group, church, etc.;

2) the character "+" may trigger a drop-down list of email addresses for the user's Buddies (if any);

3) the word "repeat" followed by a space may trigger a drop-down list of repeat intervals;

4) the word "remind" followed by a space may trigger a drop-down list of reminder intervals; and 5) the word "via" preceded by a "remind" interval and followed by space may trigger a drop-down list of means by which the user may be contacted to be reminded, such as, by one or more of the following: email, SMS/Text messaging, instant messaging, fax, etc. This contact information may be included in the user's profile.

Figure 6A:
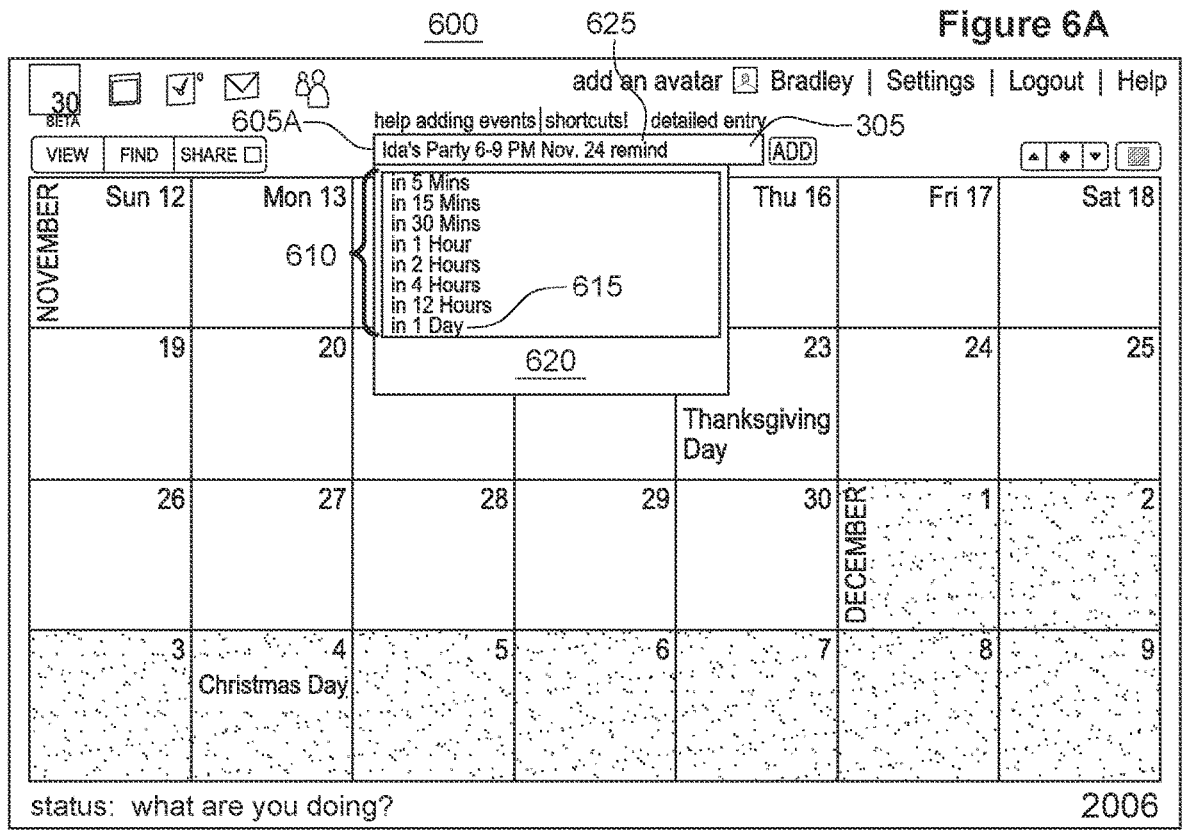
FIGS. 6A and 6B depict a one box entry wherein the one box entry interface provided an additional prompt to a user and the one box entry is amended to reflect the results of the user-selected information according to embodiments of the present disclosure.
Figure 6B:
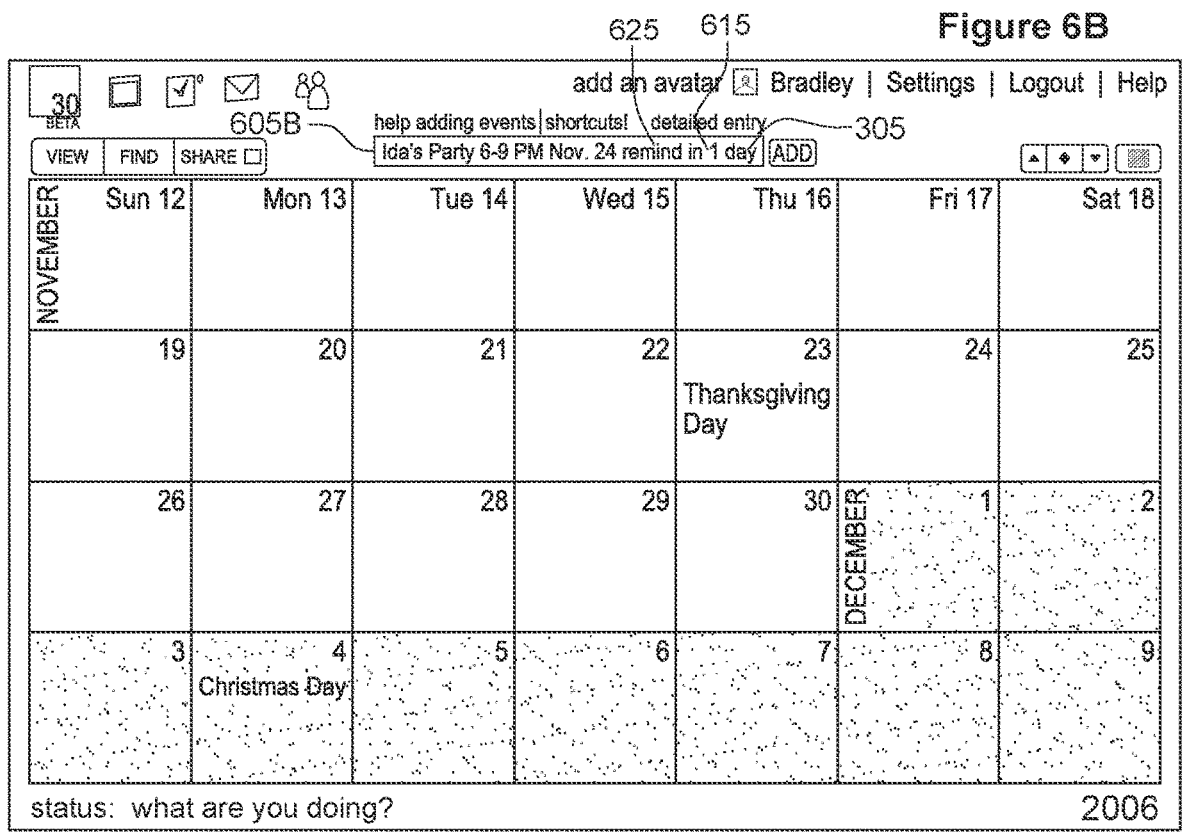

Returning to FIG. 2, the one box interface 305 may be updated (225), if necessary. In one or more embodiments, a selection from a data wizard may be appended to the inputted data in the one box interface. Consider, by way of illustration, the example depicted in FIGS. 6A and 6B. FIG. 6A depicts a view 600 in which a user has entered into the one box interface 305 an event that includes "remind" 625, which has triggered a drop-down window 620 with a list of potential remind times 610. Assuming for purposes of illustration that the user selects "in 1 Day" 615 from the drop-down list 610, the one box entry interface 305 may be updated to append the selected time interval. Thus, the initial entry 605A of "Ida's Party 6-9 PM November 24 remind" is updated to "Ida's Party 6-9 PM November 24 remind in 1 Day" 605B. It should be noted that not all entries may require updating, and thus step 225 may be optionally performed. Alternatively, information selected or added by a user could be set in hidden fields instead of and/or in addition to being appended in the one box entry.

Figure 7A:
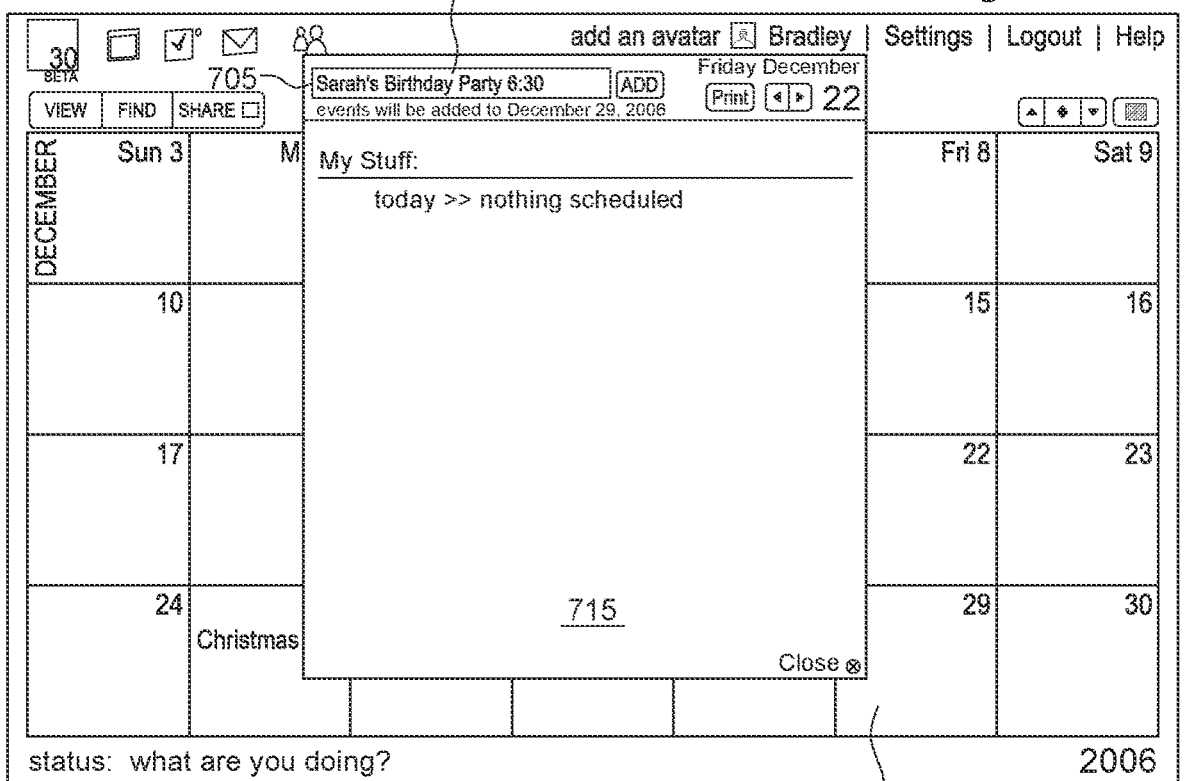
FIGS. 7A and 7B depict a one box entry wherein the one box entry interface provided additional prompts to a user based upon information extracted from the entered text according to embodiments of the present disclosure.
Figure 7B:
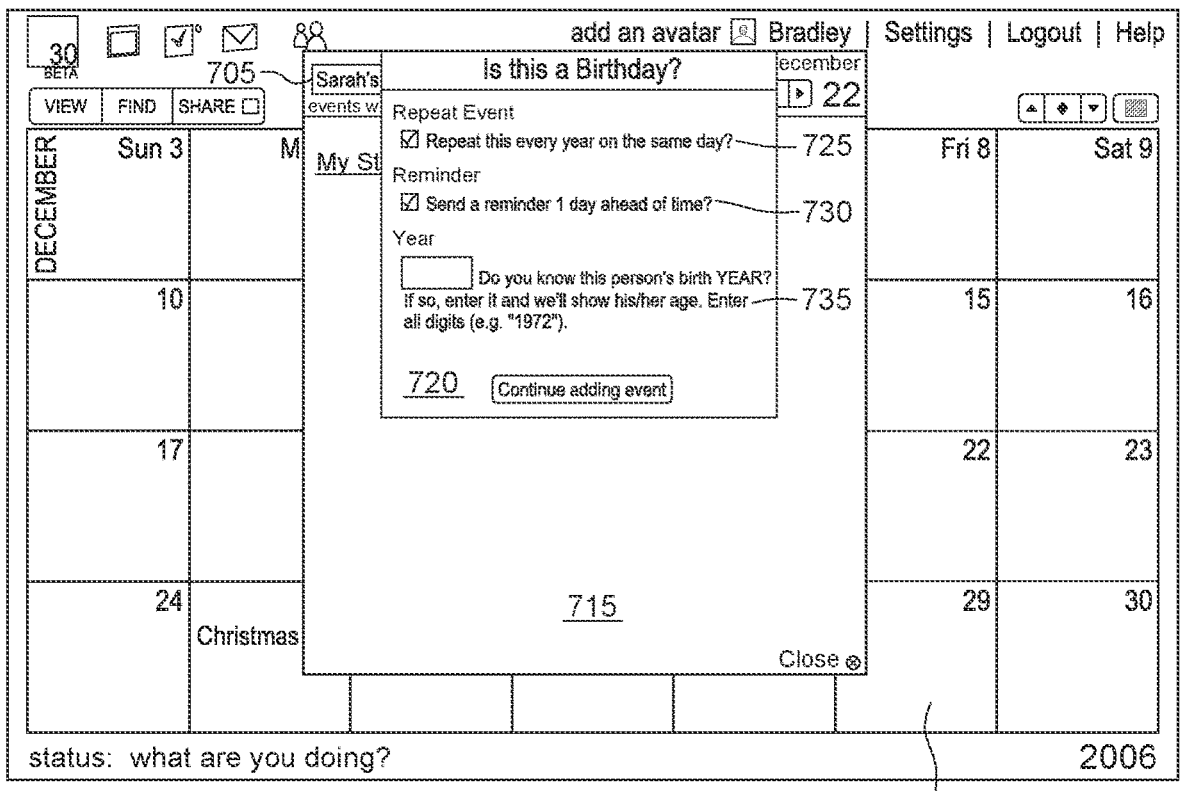

It shall also be noted that data wizards or prompts may be provided for other reasons, including but not limited to, providing options for entry of event information, to resolve ambiguities, or to obtain user input on additional matters. Consider, by way of illustration, the example depicted in FIGS. 7A and 7B. As illustrated in the interface 700A shown in FIG. 7A, a user has entered the event "Sarah's Birthday Party 6:30" 705 in the one box entry 305 while in the day view 715 of December 22. When the user submits (230) the inputted text, the inputted text 705 may be parsed (235) and actions may be taken (240) depending upon the results of the parse. For example, identification of variants of the word "Birthday" or "Anniversary" may trigger a birthday data wizard or anniversary data wizard. As illustrated in the interface 700B shown in FIG. 7B, identification of the word "Birthday" in the inputted data 705 may cause a prompt 720 to be displayed to the user that asks questions related to the birthday, such as, whether the user wants to have the event repeat annually 725, whether the user wants a reminder sent 730, and whether the user wants to include additional information such as the person's birth year 735. Additional prompts might include adding an item to the user's To Do lists, such as "Buy Birthday Gift." The user may also be offered the option of having reminders of the To Do item sent at a specified interval or intervals and via a specific means (email, SMS/Text messaging, instant messaging, fax, etc.). As mentioned above, data wizards may initiate interaction or interact with a third party or outside service.

It should also be noted that to further reduce the amount of data that a user may need to input into the one box interface and/or to facilitate processing of an event, embodiments of the present disclosure may utilize assumptions. In one or more embodiments, additional data may be used to determine what assumptions should be used. For example, the view from which a user inputs data into the one box interface 305 may be noted and assumptions may be made based upon that view. In one or more embodiments, it may be assumed that any entry made to a primary view that does not contain an explicit date (e.g., Feb. 2, 2007) or relative reference to a date (e.g., next Thursday) may be assigned the current date of the user's local time. It may be assumed that entries made from a day view may be assigned a default time of that date. Thus, for example, because the event depicted in FIG. 7A was entered while in the day view 715 of December 22 and because no date was specified, it may be assumed that the event occurs on that date. In one or more embodiments, additional assumptions may be made. For example, in one or more embodiments, relative date references may be assumed to be in the future. That is, if the user enters "Tuesday," it may be assumed that the next Tuesday in the future (based on the user's local time) may be selected for the date of the event.

Returning to FIG. 2, once the action (240) has been taken (if any), the data may be submitted for processing (245) to extract the event information. In one or more embodiments in which the present invention operates in a client-server environment, submission (245) of the inputted data may involve transmitting the inputted data to a server, such as for example, system 1130. It should be noted that additional data may also be transmitted, including, but not limited to, user data, hidden form data, and user local time data. The data may be parsed (250) and a structured data file may be generated (250) from the parsed data. The structured data file may contain one or more field related to the event including, but not limited to: event summary, start date/time, end date/time, notes, invitees, location, tags, privacy setting, repeat pattern, reminder setting, and attached documents. It shall be understood that In one or more embodiments the structured data file may be a database record or multiple records. If necessary, one or more additional actions may also be triggered (250).

Additional actions include, but are not limited to, causing one or more actions to be performed contemporaneously and/or at a future date. The action may involve interfacing with one or more applications. The applications may be part of data manager 1130, or data manager 1130 may interact or otherwise interface with the applications to perform the action, such as for example, sending invitations to invitees of the event.

It should be understood that, in one or more embodiments, steps 235 and 240 may be performed on the client side, such as by example client module 1125, and that steps 245-255 may be performed on the server side, such as by server 1130. However, one skilled in the art shall recognize that a single system may perform the steps. Accordingly, in one or more embodiments, steps 235, 240 may be consolidated with step 250 and/or with step 255. Furthermore, some of the steps of the methods depicted herein may be optionally performed. For example, steps 220 and 225 of FIG. 2 may be optionally performed or, alternatively, may be consolidated with one or more other steps, such as steps 235, 240, step 250, and/or step 255.

As previously noted, in one or more embodiments one or more actions may be triggered (240/250/255). Examples of these actions may include, without limitation, the following:

1) If an email has been identified (+emailAddress), one or more of the following actions may be performed:
   a) create an additional "Invitation" event type that will cause this event to appear on the invited user's calendar, if that user has an account with the calendaring application. In one or more embodiments, an invited event may be displayed with a display feature or features indicating to the user that it is an invited event;
   b) trigger messaging (email, SMS, IM, or other) to contact the invitee;
   c) create a new user profile associated with the email if one does not exist. The new user profile may include auto-discovery personalization to gather information related to the email address. For example, the email address may be used to search blogs, posting sites (photo posting, video posting, etc.), web sites, and other places on the Internet to gather information associated with that email address. In one or more embodiments, a profile for a non-user of a service, which may be referred to as a phantom profile, may be created as described in commonly-assigned U.S. Pat. No. 9,094,469, issued Jul. 28, 2015, entitled "PROFILE GENERATION, USE, AND MANAGEMENT," which is incorporated herein by reference in its entirety.
   d) establish a trusted relationship between the user's account and the account referenced by an invitee identifier (e.g., email address, phone number, instant message account name, etc.). For example, a trusted relationship may be obtained by contacting the email address recipient and having the person verify himself/herself. In one or more embodiments, a trusted relationship may be formed by sending a unique code in an email to the person. By selecting or clicking a link in the email message with the unique code (or entering that code on the web site), a trusted relationship may be formed because the email address was valid.

2) Repeat—repeat interval may be set in the calendar event.
3) Remind—a reminder may be set to be delivered according to the user's preference (email, SMS, IM, or other).
4) Examine the Notes field and take an action responsive to data in the Notes field.
5) Parse phone numbers and hotlink the numbers so that they are dialed or can be quickly dialed—such feature is of particular benefit to mobile versions of the present invention operating on a mobile phone or PDA with phone capabilities.
6) One or more tags may be associated with an outside or third-party service. In one or more embodiments, a tag may be associated with one or more web services and may be triggered immediately or in a scheduling system. Consider, by way of illustration and not limitation, the following example: A user inputs an event to wash his clothes on February 26 and sets a reminder using the following "tag sms tag washing machine tag twitter". On February 26, data manager 1130 and/or client module 1125 cause the following to occur: a) the user is sent an SMS message to remind him; b) an http request with xml data is made to his washing machine and it starts running; and c) an http request is made to Twitter with his credentials and a blog about it is posted to his friends.

In one or more embodiments, system 1130 may perform some or all of the above action or may interface with one or more systems or applications to perform the action, including without limitation a client module. For example, server 1130 may interface directly or indirectly with an application 1145 (e.g., email, SMS, IM, etc.) to have a reminder sent or to notify an invitee. In one or more embodiments, the application or system 1145 may be part of data manager 1130 and/or may be a third-party application or system 1145. In one or more embodiments, the client 1125 may perform one or more of the actions. For example, display actions may be performed by client module 1125 upon return of the structured data file.

In one or more embodiments, the structured data file is returned (255) to the user and one or more actions may be triggered upon return. In one or more embodiments, the returned data may comprise or also include html and/or javascript code derived from the structured data. In one or more embodiments, the client-server system 1100 may employ AJAX (asynchronous javascript and xml, which is a method of posting data to a server from a client and affecting an action within a browser without refreshing the entire page) and a client-side display function, which may be part of the client-side processing of the client module 1125, may be called as part of the actions. The local data objects may be updated and a Display Update function or functions may be triggered. In one or more embodiments, the calendar display may center on the new event and trigger a visual notification, such as a color flash.

Other actions triggered (240/250/255) may include without limitation:
1) examining the notes field or other fields in the structured data to identify actions such as converting URLs to hyperlinks; and
2) examining the notes field or other fields in the structured data to identify locations or direction information and add a map or directions or a hyperlink to a mapping service (e.g. Mapquest, Yahoo! Maps, Google Maps, etc.)

3) providing weather forecasts (or hyperlinks to the information) for locations;
4) displaying text according to tags—certain tag types create display effects (such as colored fonts) or text formats (such as strikethrough); and
5) the tag "important" displays an importance indicator (such as a star) for an event.

Figure 8:
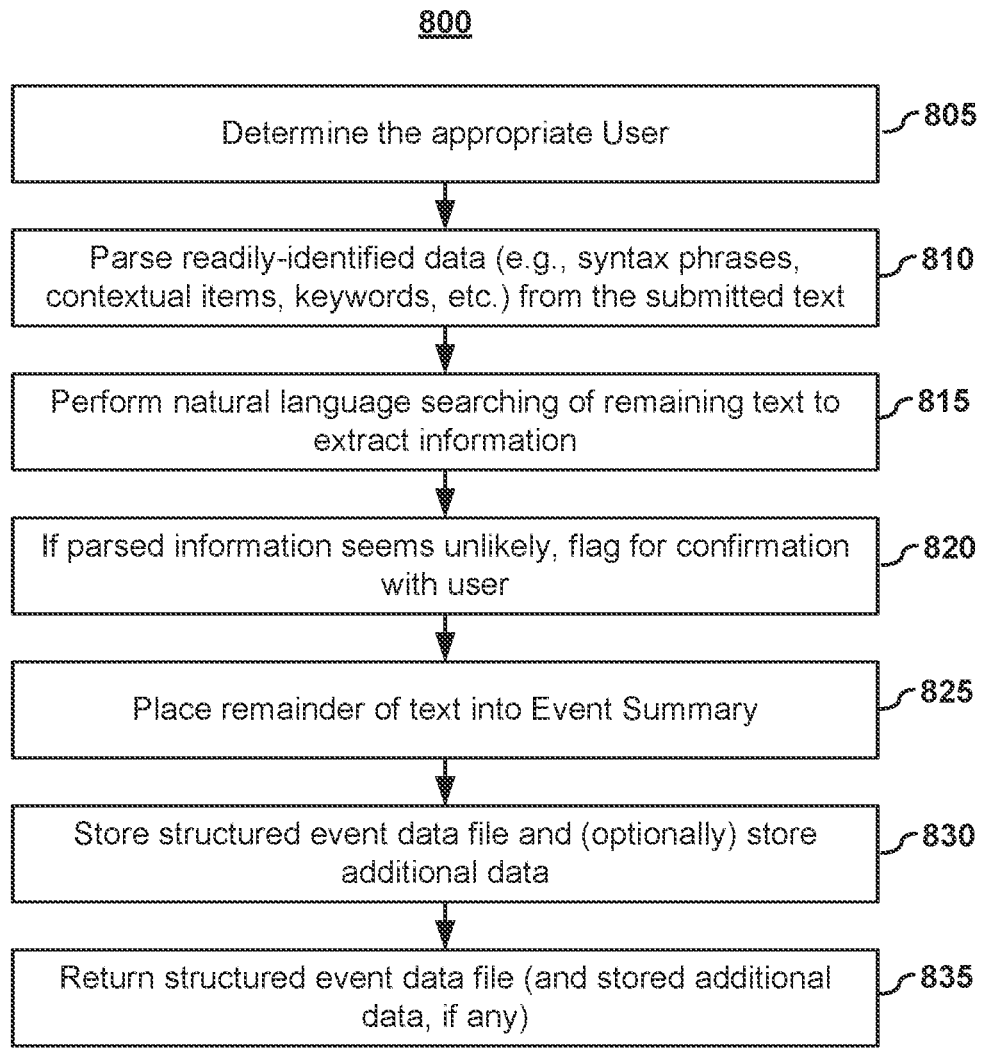
FIG. 8 depicts a methodology for processing data submitted by a user according to embodiments of the present disclosure.

Turning to FIG. 8, depicted is a methodology for processing submitted data, according to embodiments of the present disclosure. In one or more embodiments, the methodology of FIG. 8 may correspond, at least in part, to steps 245-255 of FIG. 2. Upon submission of the data, a series of algorithms or operations may be applied to the data. In one or more embodiments, the data may be posted to a server, such as server 1110 of FIG. 11. The server may determine (805) the appropriate user to associate with the submitted data. Identification of the user may be an issue where, for example, the data is not submitted via a user logged into the calendaring application. Examples of data submitted for processing that have not be submitted via a user logging into the application through a web browser may include, without limitation, submission of via email, SMS/Text message, or instant message. In such cases, for example, the user may need to be identified (805) by an email, phone number, user name, or other unique identifier.

Consider, for purposes of illustration, submission of information by email. A user may schedule an event by sending an email to the calendaring application. For example, an email may be sent to an email address at 30boxes.com where it is piped from a mail server to the application layer. In one or more embodiments, the email may be authenticated (either by recognizing the "To" address as a custom email address used for that user only or by using the "From" address and comparing it to existing calendaring users). In one or more embodiments, the email may be addressed to additional individuals as well and those email addresses may be included in the user's list of emails/buddies. In one or more embodiments, those emails may be included as invitees of the event.

In one or more embodiments, the subject line and/or the message body may be considered as an equivalent to data entered into a one box entry interface 305. In an alternative embodiment, the subject line of the email may be treated as a one box data entry and undergoes the steps described herein from the point that the data is posted to the server. In one or more embodiments, the body of the email may be parsed by separating out MIME types, and if it contains a plain text or html MIME type, the body may be converted into an html page that is stored in a database (such as database 1135A) or a file system (1135B) and may be linked to the new event as an attachment. In one or more embodiments, other MIME types may be supported such as audio, video, images, and the like.

In one or more embodiments, a response, such as a return email or other notification, may be sent to the user alerting the user of the success or failure of the event creation.

Returning to FIG. 8, following identification of the user (805), the submitted data may be parsed to locate readily-identified text, such as syntax clues, contextual clues, keywords, and the like. In one or more embodiments, this readily-identified information may be parsed in an iterative fashion. Consider, by way of illustration, the following examples of readily-identified text that may be parsed:

a) Phrases containing "remind" or "reminder", such as "remind in 1 hour" denote a reminder to be stored and may be triggered at a later time to remind the user of the event. The reminder may be a variety of common time descriptions, such as 5 minutes, 15 mins, 1 hour, 1 day, 2 weeks, etc., or variations thereof.

b) "+emailaddress" denotes an invitee to the event and may trigger a notification action to the invitee(s).

c) "+emailaddress!" denotes an invitee to the event and may trigger a notification action with an urgency flag. In one or more embodiments, an urgent notification may involve sending an invitation via SMS/Text Message.

d) "tag tagname" denotes one to N labels which may be used to group or classify events and/or for granting permissions to third parties to access events. In one or more embodiments, an event may be shared using metadata, such as tags, as described in commonly-assigned U.S. Pat. No. 8,161,069, issued on Apr. 17, 2012, entitled "CONTENT SHARING USING METADATA," which is incorporated herein by reference in its entirety.

e) "tag specialTag" denotes a tag that triggers a display action (e.g., tag blue shows the event in a blue font).

f) an asterisk denotes priority.

g) parentheses contain notes related to an event (e.g., second floor, ask for Bob).

h) "private" denotes a privacy setting.

i) square brackets may be used to denote a location (e.g., [san francisco, ca]). In one or more embodiments, the location information may be used to obtain directions by setting two locations with the square brackets. For example, [location_1|location_2] may be used to obtain directions for the user from location_1 to locations_2. In one or more embodiments, if a user sets his home or work locale in his profile, then he can obtain directions from home (or work) to the location by entering [home|location_2] or [work|location_2].

j) Phrases contain "repeat" denote that the event repeats according to rules specified in the phrase, such as annually, yearly, monthly, weekly, biweekly, daily, etc. and their common abbreviations.

k) "repeat interval until date" denotes a repeating event that has an end date. One skilled in the art shall recognize that other repeat format may be employed depending upon the complexity of the repeat.

l) all uniform resource locator (URLs), for example, strings that begin with http://, may be stored within the notes field. In one or more embodiments, the URLs may be converted to hyperlinks.

It shall be noted that to aid in the extraction of the event information, syntax, context clues, fixed or suggested formats may be employed. By way of illustration and not limitation, examples are provided in Appendix A.

In one or more embodiments, all readily-identified data may be removed from the submitted data and the remaining text may be submitted for processing (815) using natural language logic (NLL) to extract information. Natural language logic may be used to deduce the intended date of the event from the submitted data. Dates may be explicitly stated in standard formats (5/1/07, May 1, 2007), abbreviated versions (June 1, 6.1), or relative references (tomorrow, next tuesday). The dates may be a single date or may be spans (e.g., May 1-5). The dates may include a single time or time spans (e.g. May 1 2-3 pm). The natural language logic is used to examine, rearrange, and prepare the text that is thought to contain date and time information. In one or more embodiments, the data may be broken into parts and repeatedly tested with the PHP function "strtotime" until the entire date, time, or date/time span has been deduced. One skilled in the art shall recognize that other string-to-time functions or applications may be employed and that no specific function or implementation is critical to the present invention.

Figure 9A:
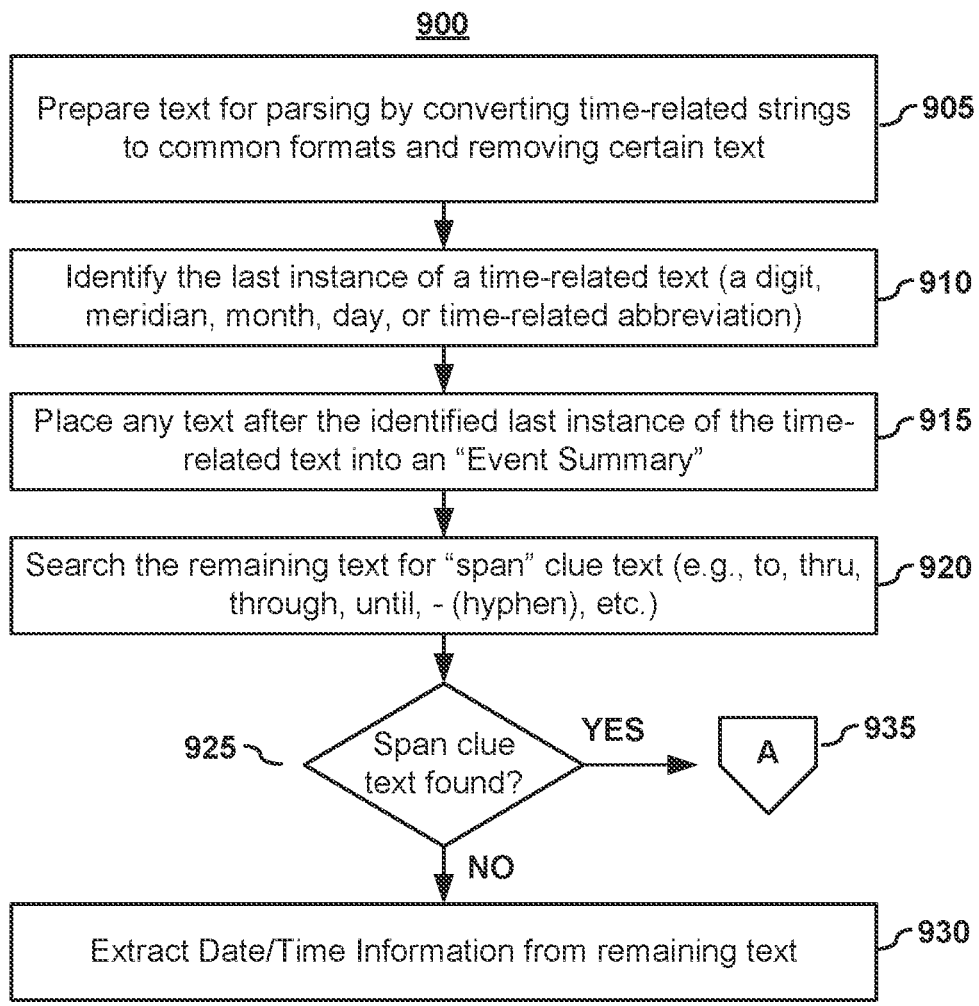
FIGS. 9A and 9B depict a methodology for parsing text obtained from a one box event entry according to embodiments of the present disclosure.
Figure 9B:
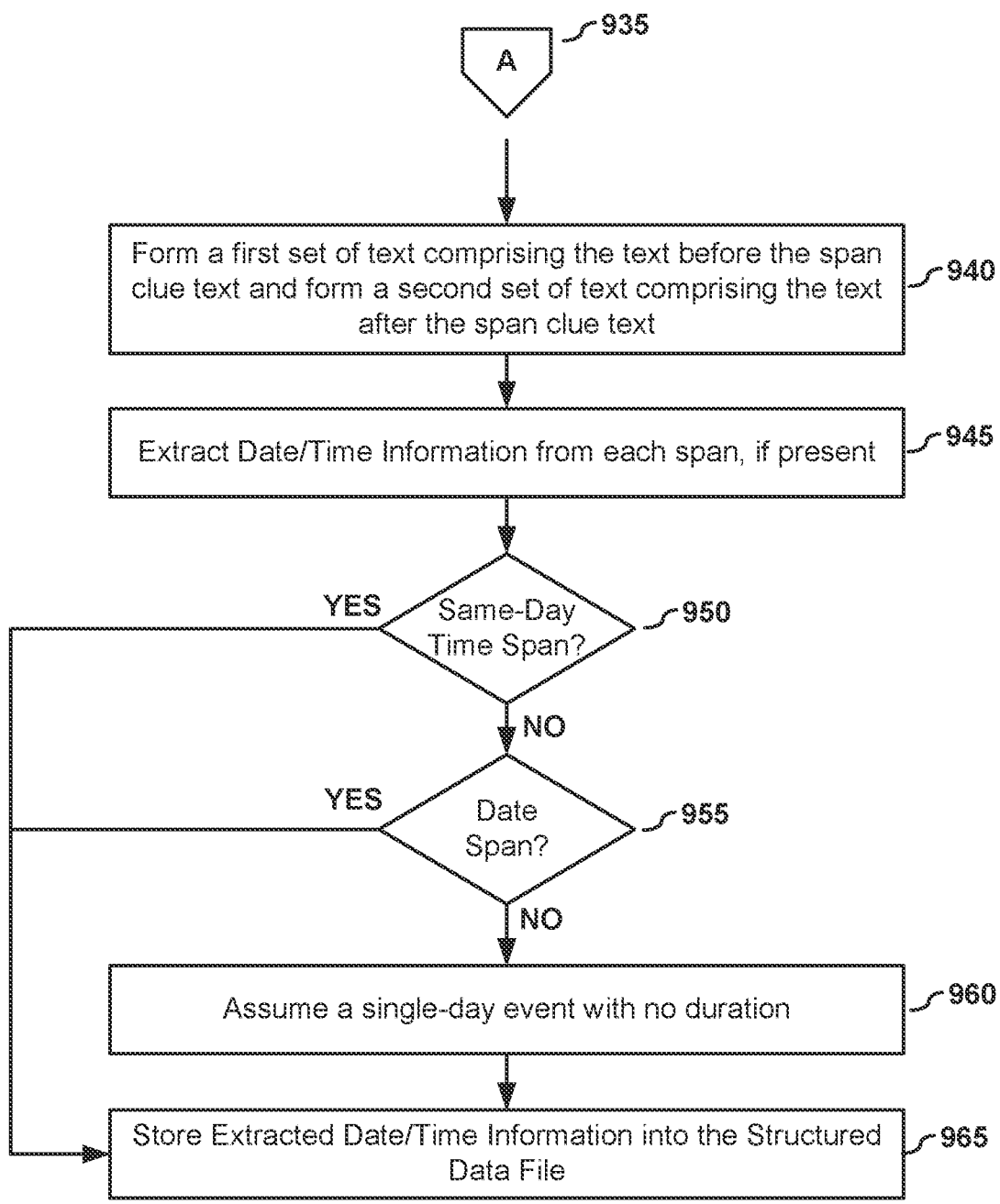

FIGS. 9A and 9B depict a methodology for extracting date/time information from the submitted text. The text may be prepared for parsing by converting (905) time-related string (that is, date or time) to common formats and remove certain text, such as readily-identifiable data (if any). In one or more embodiments, assumptions may also be made related to the text. Examples of assumptions may include, but are not limited to, relative date references, views from which data was entered, practices of users, practices of a user, formats, etc. In one or more embodiments, the remaining text may be used because it is not known where the date/time components lie within the text.

For purpose of illustration, listed below are some examples of conversions of time-related strings to regular or common expressions:

a) European-style times (12.15 pm) may be changed to US-style (12:15 pm);
b) 1st, 2nd, 3rd, etc. may be changed to 1, 2, 3
c) day abbreviations (e.g., "tues" and "thurs") may be changed to complete words (e.g., "Tuesday" and "Thursday");
d) space may be added between month names (or their abbreviations) and the date (e.g., "January 2" changes to "January 2").
e) "noon", "midnight" and similar abbreviations may be changed to actual times, such as "12 pm".
f) "a" or "p", when preceded by a time format, may be changed to "am" or "pm" (e.g., 5:00a changes to 5:00 am, 5a changes to 5 am).
g) Single characters following a time format may be removed. In one or more embodiments, single characters following a time format may generate erroneous time zone information and are therefore removed.
h) Periods may be removed from meridian abbreviations (e.g., "5 a.m." changes to "5 am").
i) Colons may be added to time formats if they are missing (e.g., "530 am" changes to "5:30 am").
j) Spaces may be removed between the time and meridian (e.g., "5 am" changes to "5 am").
k) The word "at", when preceding a time format, may be removed.
l) If the meridian is missing from a time format, an assumption may be made as to the meridian based on the hour, and the meridian is added. For example, times between 1-6 may be assumed to be PM rather than AM. In one or more embodiments, if the user has indicated that they use European time standard or 24-hour time (1 pm would be 13:00), a meridian would not be assumed.
m) Commas between date and time formats may be removed.

One skilled in the art shall recognize that the above conversions may not be required to be done for the parsing and that the selection of formats is a choice of style and is not critical to the practice of the present invention.

The modified data may then be examined (910) for the last instance of a digit, meridian, month name, day name, or time-related (time/date) abbreviation. In one or more embodiments, any text after that instance may be removed and added (915) to the event summary field of a structured message file, or alternatively, may be added to a notes field.

The remaining data may be searched (920) for span clue word (e.g., to, thru, through, until, -, etc.). If a span word is not found (925), the remaining data may be examined (930) to extract date/time information. If a span word is found (925/935), the remaining data may be split (940) in two sets of text, wherein the first set of text comprises the text before the span clue word and a second set of text comprises the text after the span clue word.

Each set of text may be examined (945) to extract the date/time information, if it is present in the set of text. If the two sets represent a same-day span, that information may be stored (965) in a structured data file. If the two sets do not represent a same-day span, the two sets may be examined to determine (955) if they represent a date span. If the two sets represent a date span, that information may be stored (965) in a structured data file. If the two sets do not represent a date span, it may be assumed (960) that the event is a single-day event with no duration, and that information may be stored (965) in a structured data file.

Figure 10:
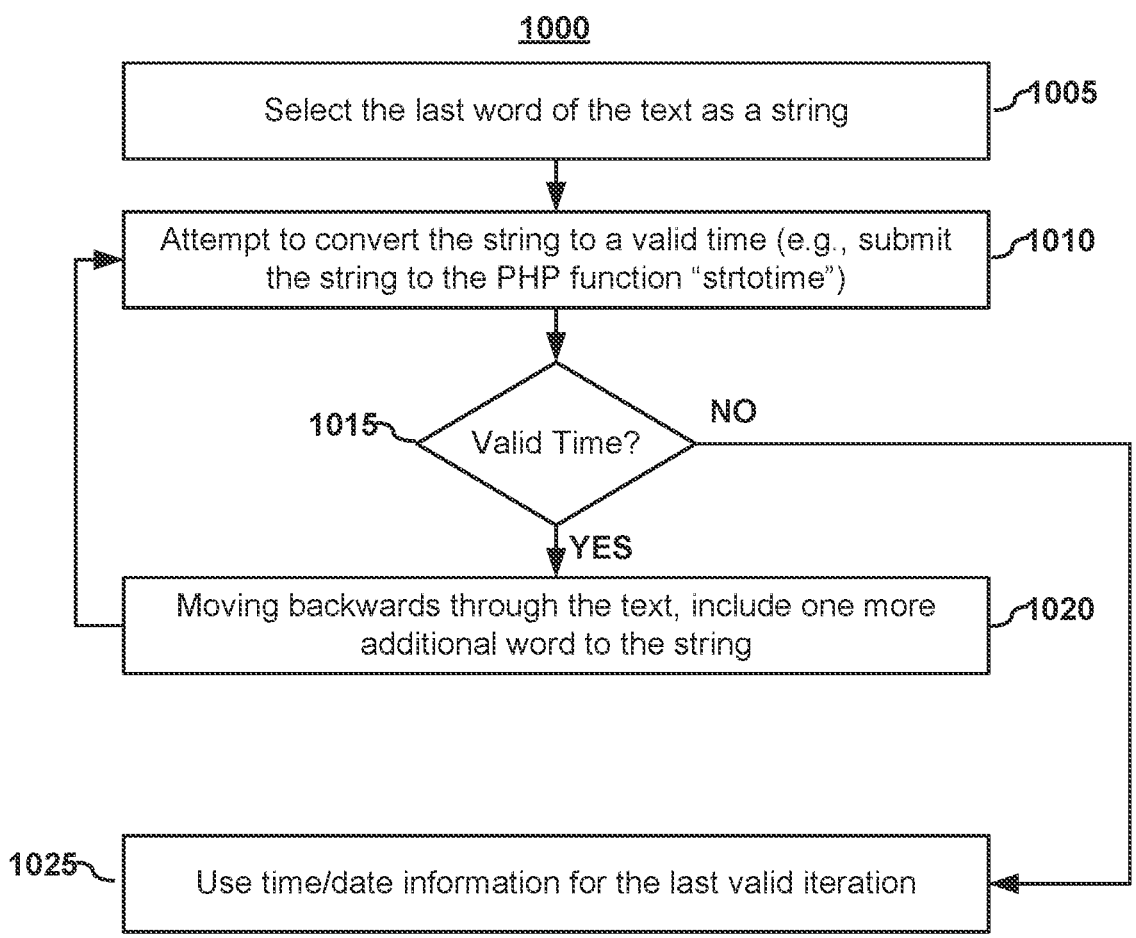
FIG. 10 depicts a methodology for extracting date/time information from text obtained from a one box event entry according to embodiments of the present disclosure.

FIG. 10 depicts a methodology 1000 for extracting date/time information for a string of text according to embodiments of the present disclosure. In the depicted embodiment, the last word of the text may be selected (1005) as a string of text. That string may be submitted (1010) to the PHP function "strtotime" to determine (1015) if that string is a valid time/date. This process may be iterated backwards through the text, wherein one more word is included (1020) each time so long as the string continues to return a valid time/date from the PHP function. As soon as there is not a valid time/date returned from the PHP function, the last valid time/date is selected as the time/date information and the parsing for that text is completed.

Returning to FIG. 8, in one or more embodiments, if the parsed date range seems unlikely (820), the event may be created but the user may be asked to confirm if the dates are correct. In one or more embodiments, the user may be asked to confirm the dates after the event information has been returned to the user. What seems unlikely may be user-selected or preset. For example, it may be determined that an event that starts or ends more than 330 days in the future or that has a duration over 60 days may be flagged as unlikely. One skilled in the art shall recognize a number of possible situations that may be selected as being unlikely. In one or more embodiments, after removing the date/time related text, the remainder of the text may be selected (825) as the event summary and may be stored in the event summary field of the structured file. In one or more embodiments, the structured data file may be stored in an events database table, such as database 1135A at the system 1110. Also, in one or more embodiments, additional data may be stored in a database 1135A or in a file system 1135B. For example, attachments from emails may be stored and associated with the structured file. As noted previously, the structured file may be returned (835) to the user for display. In one or more embodiments, any associated additional data may be sent to the client or may be made available to the users.

One skilled in the art will recognize that embodiments of the present disclosure, some of which are described herein, may be incorporated into a number of different systems and devices including general purpose computers, specialized computers, mobile devices (including without limitation mobile telephones, personal data assistants (PDAs), and multimedia devices), and the like. The embodiments of the present disclosure may be implemented in software, hardware, firmware, or combinations thereof. It shall be noted that the specific implementation is not critical to the present invention.

It shall be understood that devices or components (or modules), shown in block diagrams are illustrative of embodiments of the invention and are meant to avoid obscuring the invention. It shall also be understood that throughout this discussion that device or components may be described as separate functional units, which may comprise sub-units, but those skilled in the art will recognize that the various devices or components, or portions thereof, may be divided into separate devices or components or may be integrated together, including integrating within a single system, device, or component.

Furthermore, connections between devices, systems, and components within the figures are not intended to be limited to direct connections. Rather, data between these items may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Figure 11:
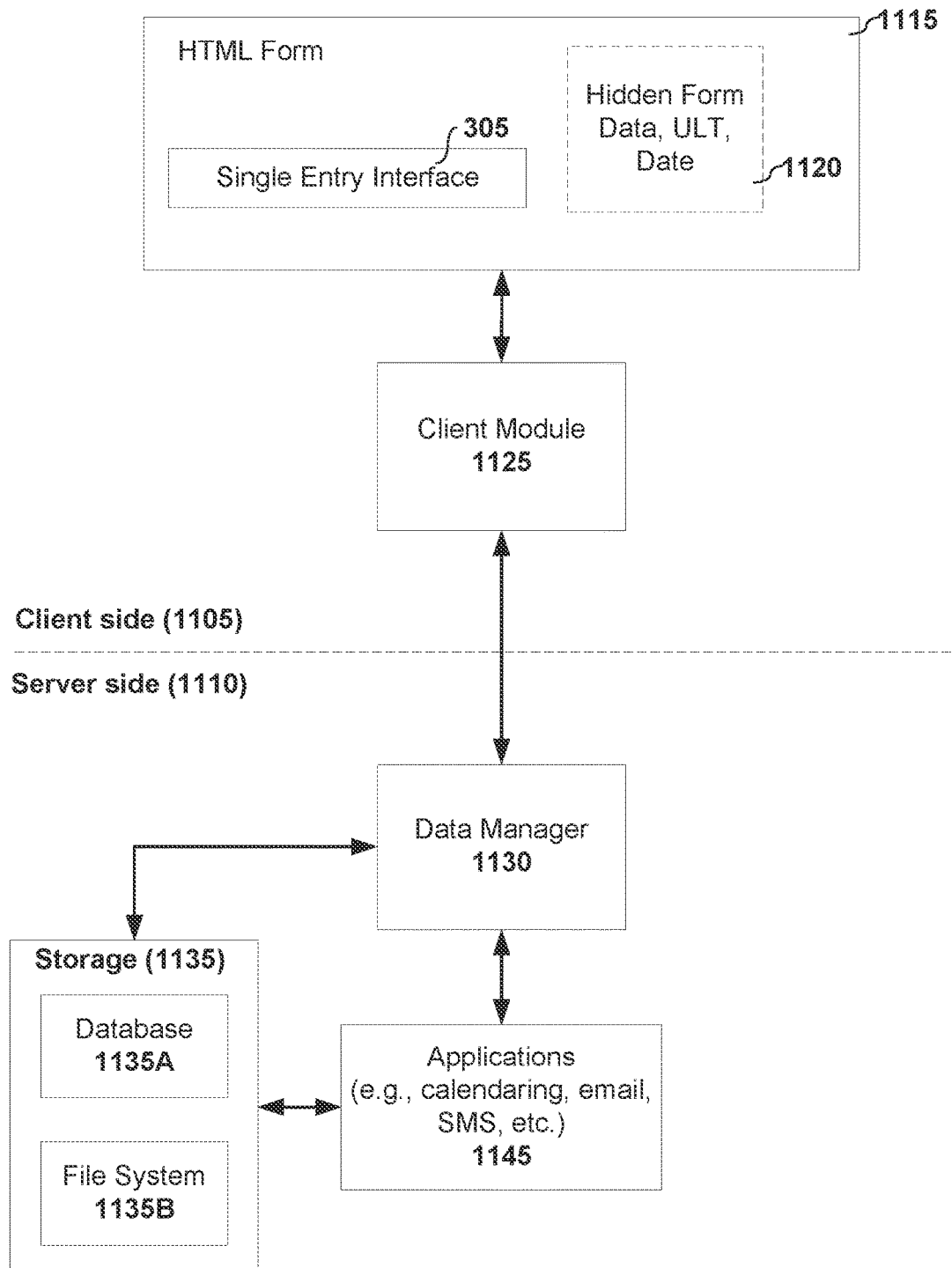
FIG. 11 depicts a system for providing a one box entry according to embodiments of the present disclosure.
Figure 13:
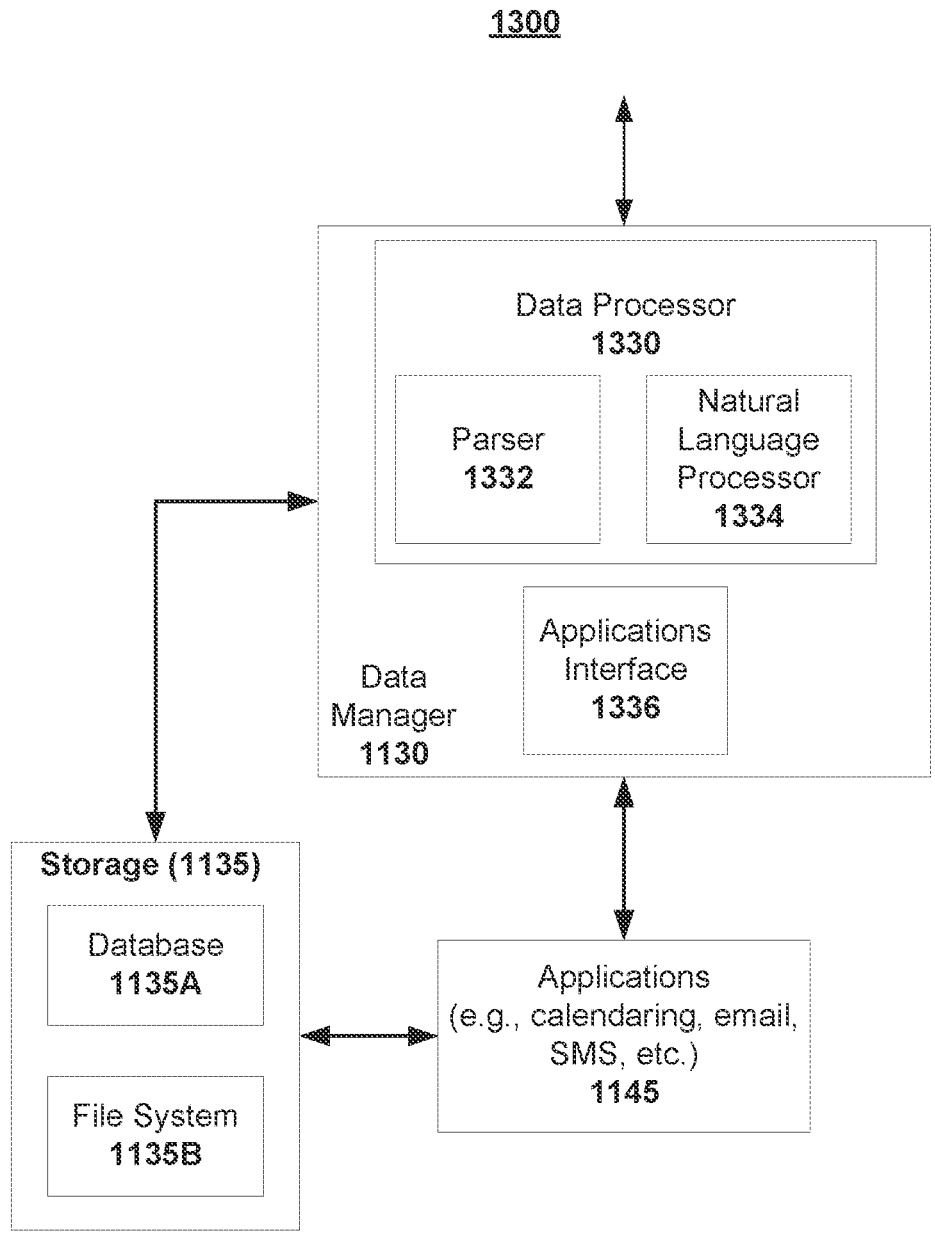
FIG. 13 depicts a data manager according to embodiments of the present disclosure.

FIGS. 11 through 13 depict embodiments of systems of the present invention, which may perform the steps of methods depicted herein. FIG. 11 depicts a client-server architecture 1100 wherein a method for receiving and processing an event entry may be distributed between one or more applications processed by a client system 1125 and a server system 1130. The system 1100 depicted in FIG. 11 may be part of a network of computers, such as, but not limited to, an intranet or the Internet. FIG. 12 depicts a client system 1200 according to embodiments of the present disclosure. FIG. 13 depicts a server system 1300 according to embodiments of the present disclosure. It shall be noted that no specific implementation of the methods of the present invention, whether embodied in one or more applications and whether standalone, distributed, or networked (e.g., peer-to-peer or client-server), nor the specific implementation of the device or system is critical to the present invention.

As previously indicated, embodiments of the present disclosure may be implemented in a web application. For purposes of illustration, an example of such an embodiment is provided herein. In one or more embodiments, a user loads 30boxes.com, wherein interface/display module 1128 displays a form, such as an html—the time zone is set as part of the html form 1115 and the One Box entry interface 305 is displayed. Assume for this illustration that the user types the following characters:

Mike's Birthday May 1 tag

In the embodiment depicted in FIG. 12, the data wizards 1127 may reside on a client module 1125. The client 1125 may include client-side logic functions that determine when an action should be taken based upon the inputted data and triggers an appropriate data wizard or wizards 1127. In one or more embodiments, data wizards may comprise blocks of HTML and javascript that facilitate the selection of certain options related to event creation and trigger either a string of post-pended text to an input form element or the creation of a hidden form element.

After the word "tag" has been entered, the client parser and analyzer 1126 recognizes that a trigger text has been added and the appropriate data wizard 1127B causes a prompt (such as a drop-down menu of the user's existing tags) to be displayed for easy selection of one or more tags.

Assume the user selects the following tag:

personal

Also assume that the user ends the entry with an asterisk

Mike's Birthday May 1 tag personal*

In one or more embodiments, when the "Add" button is clicked, the client module 1125 may parse the text locally and recognizes the event as a birthday. Another data wizard 1127 may initial a pop-up dialog to be displayed to allow further settings. The form data is then submitted to the data manager 1130, which may include data from hidden form fields 1120 and the unstructured data from the one box text.

The data manager 1130 receives the information and the one box text may be parsed to identify syntax clues to create fields for the new event data object. Natural language logic may be used to deduce times, dates, and other fields of the event. During the course of the parsing, certain actions may be triggered. In this example, an annual reminder action will be set for the event. Thus, in one or more embodiments, data manager 1130 may also include data wizards (not shown) or one or more application interfaces 1336 to facilitate interaction with one or more application 1145. The event data may be stored in a table in storage 1135 on the server, and additional data may be stored relating to triggered actions (such as the reminder). It should be noted that storage 1135 may be part of data manager 1130. Applications 1145 may also be part of data manager 1130 and/or may be separate from data manager 1130.

The data is now in a structured format and may be returned to the client. In one or more embodiments, the client 1125 may parse the data locally. For example, the structured data that is returned to the client may be "parsed" by javascript so it is available for use in the javascript programs running on the client browser. The return of the structured file triggers the interface/display module 1128 to updated the user's display to reflect the new event. Additionally, certain display actions may be triggered; in this example, the display includes a star icon and a repeat icon.

Figure 23:
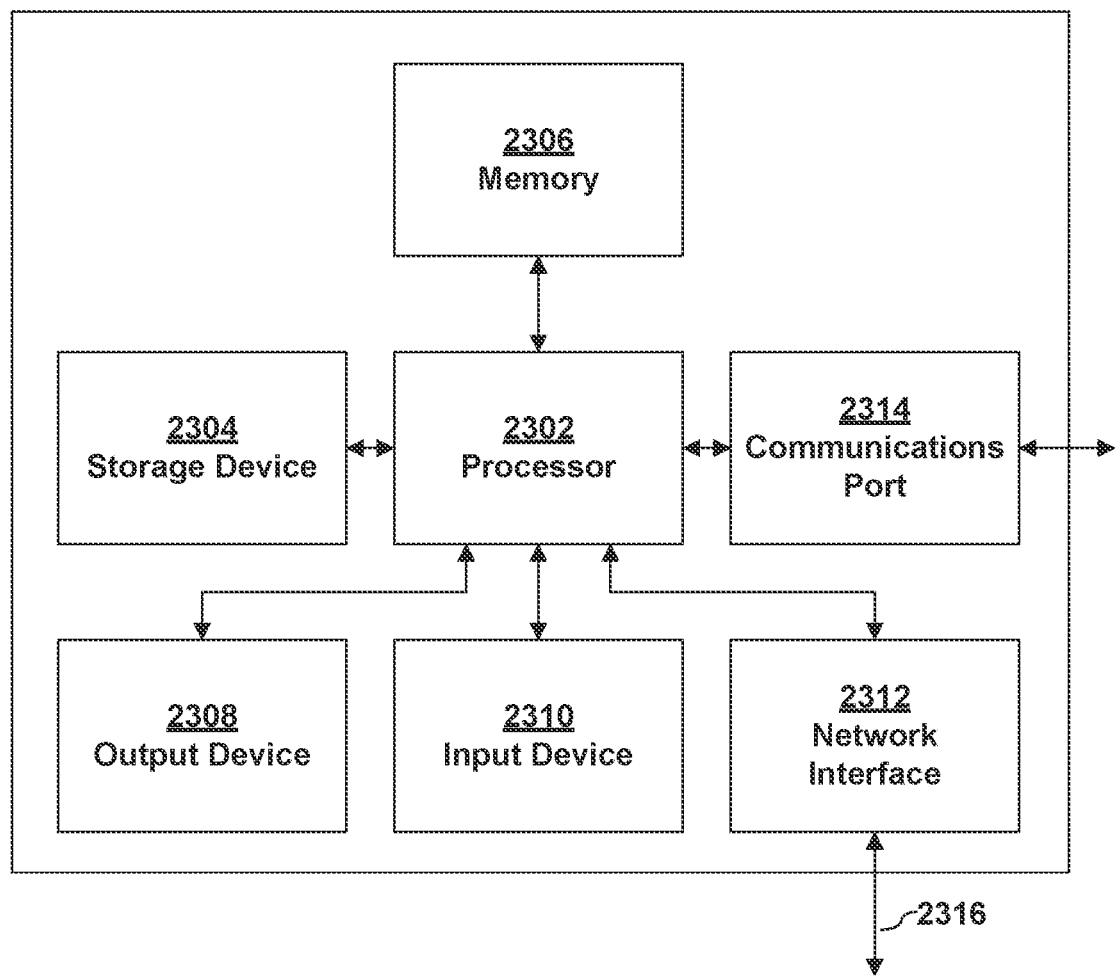
FIG. 23 depicts a function block diagram of a computing system according to embodiments of the present disclosure.

One skilled in the art shall recognize that system 1100, server system 1130, client 1105, or portions thereof may be implemented on one or more a computing/instruction-executing device, such as, for example, depicted in FIG. 23.

B. Embodiments of Tag Sharing

Aspects of the present invention relate to systems and methods for allowing the sharing of content with one or more individuals or groups. In one or more embodiments, shared content may be associated with one or more identifiers, or tags. These tags may be used to grant sharing rights to individuals or groups.

Aspects of the present invention involve systems and methods of sharing information using metadata, which may be used for various purposes, such as for permission, which metadata may also be referred to herein as a tag or label. The systems and methods of the present invention may be embodied in an application, web service, or web site, which may be a calendaring application or multimedia application that involves one or more forms of media (photos, graphics, videos, texts, animations, hyperlinks, website, and the like). In one or more embodiments, the application may be an Internet application or a networked application, wherein a user and/or the third parties (individuals and/or groups) with which the user shares content interface with the application through a browser or application interface. It shall be noted that neither the specific implementation of the methods of the present invention nor the specific implementations of a device or system is critical to the present invention.

1. Methods for Tag Sharing

Figure 14:
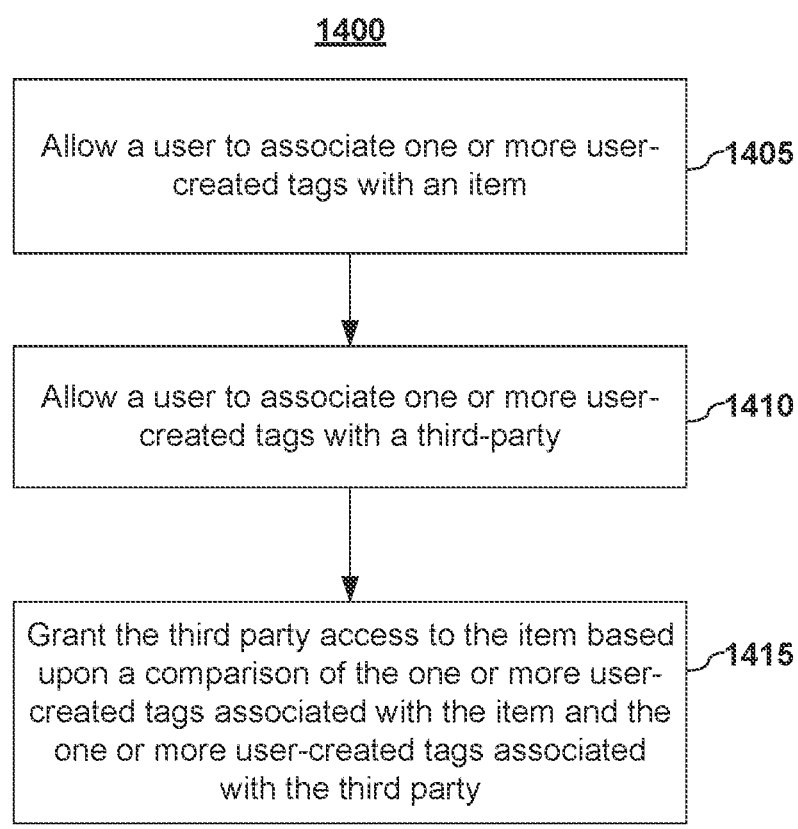
FIG. 14 depicts a methodology for sharing content items with a third-party using metadata according to embodiments of the present disclosure.

FIG. 14 depicts a methodology 1400 for sharing content items with a third-party using metadata according to embodiments of the present disclosure. A user's content is treated holistically, and the user may append metadata to the content item in the form of tags or labels. The user can have one or more descriptive tags associated (1405) with a content item. In one or more embodiments, the user may create the tag designations. The user-created tags may be selected from a pre-existing or pre-populated list. In one or more embodiments, a user interface may be presented to a user to facilitate the associating of one or more tags with content items. For example, an entry interface may be provided wherein the user may input or select tags.

A user also can have one or more tags associated (1410) with a third party or third parties. The third parties may be individuals or groups of individuals. In one or more embodiments, a user interface may be presented to a user to facilitate the associating of one or more tags with a third party. In one or more embodiments, a contacts or buddy profile may include a section for the user to input or select tags. In one or more embodiments, the user may create the tag designations. In one or more embodiments, the user-created tags may be selected from a pre-existing or pre-populated list.

Figure 15:
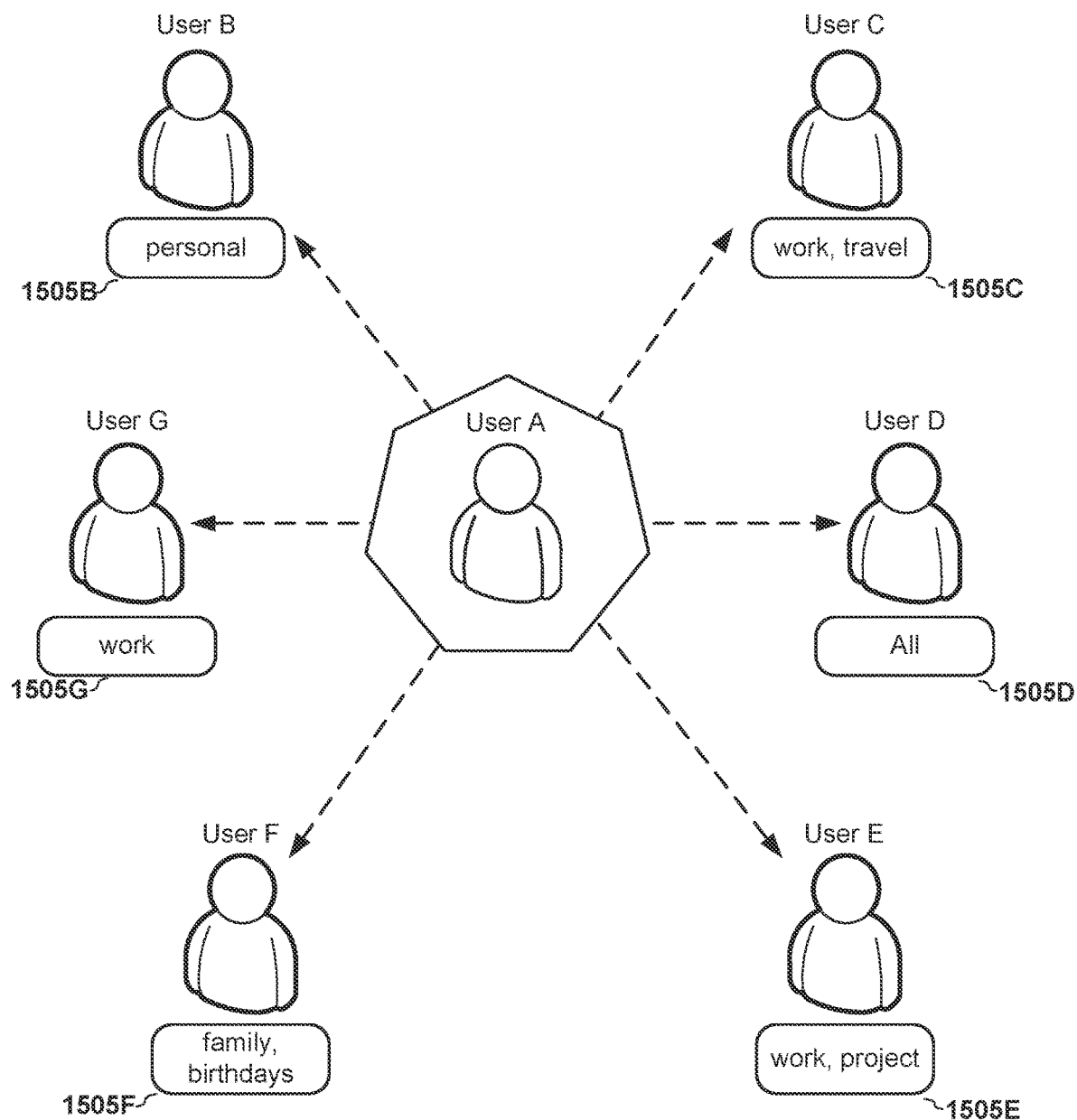
FIG. 15 graphically depicts, for purposes of illustration, metadata associated with third parties according to embodiments of the present disclosure.

FIG. 15 graphically depicts, for purposes of illustration, metadata associated with third parties according to embodiments of the present disclosure. In the depicted example, User A has metadata 1505 associated with Users B, C, D, E, F, and G. For example, User B is associated with the tag "personal," User C is associated with the tags "work" and "travel," User D is associated with the tag "All," and so forth. As depicted in FIG. 15, a third party may have a single tag association or may have more than one tag association.

It should be noted that the metadata associated with a third party may be obtained from another service or context. For example, if User A interacts with third parties through a social networking application, information related to the User A's interactions with third parties, such as key words from messages, profile information, or the like may be used or imported as part of the associated metadata.

By associating (1410) one or more tags with a third party or third parties, the user may grant access (1415) to none, some, or all of the content items using the associated tags. The granting of access to a content item may be based upon a comparison of metadata associated with the content item and metadata associated with a third party. For example, any content items with a "personal" tag are shared with User B; whereas, only content items with a "work" tag are shared with User G. In one or more embodiments, a third party who is granted access to an item may share that item with one or more additional parties. Furthermore, the third party may add or otherwise re-tag the event for sharing purposes. For example, individual A may share an item with a label "work" with individual B, and individual B could re-share or syndicate the event to individual C under a tag, such as "executives," which was set by individual B.

It shall be noted that the comparison to grant access to content items may be performed in any fashion or combination using, for example one or more logical operators, such as Boolean operators, conditionals, and the like. In one or more embodiments, logical operations may be implied. For example, a listing of descriptive tags with no logical operator may be implied to be the logical operator "OR," which creates unions of content items that contain at least one of the listed tags. In one or more embodiments, logical operations may be expressly included as part of the metadata. Alternatively, a tag may include a logical operation or operations (e.g., "Work but not Travel" may be considered a tag, and as a tag would share all content items with a "Work" label so long as there is not also a "Travel" tag associated with the content item). It should also be noted that a tag may represent a set or subset of other tag (the tag "All" may be defined to be equivalent to listing all descriptive tags linked with the logical operator "OR"). In one or more embodiments, tags may also be used to set levels of permissions including read and write permissions to content items. One skilled in the art shall recognize that a particular benefit of the present invention is the ability to quickly and easily create complex sharing arrangements.

Figure 16:
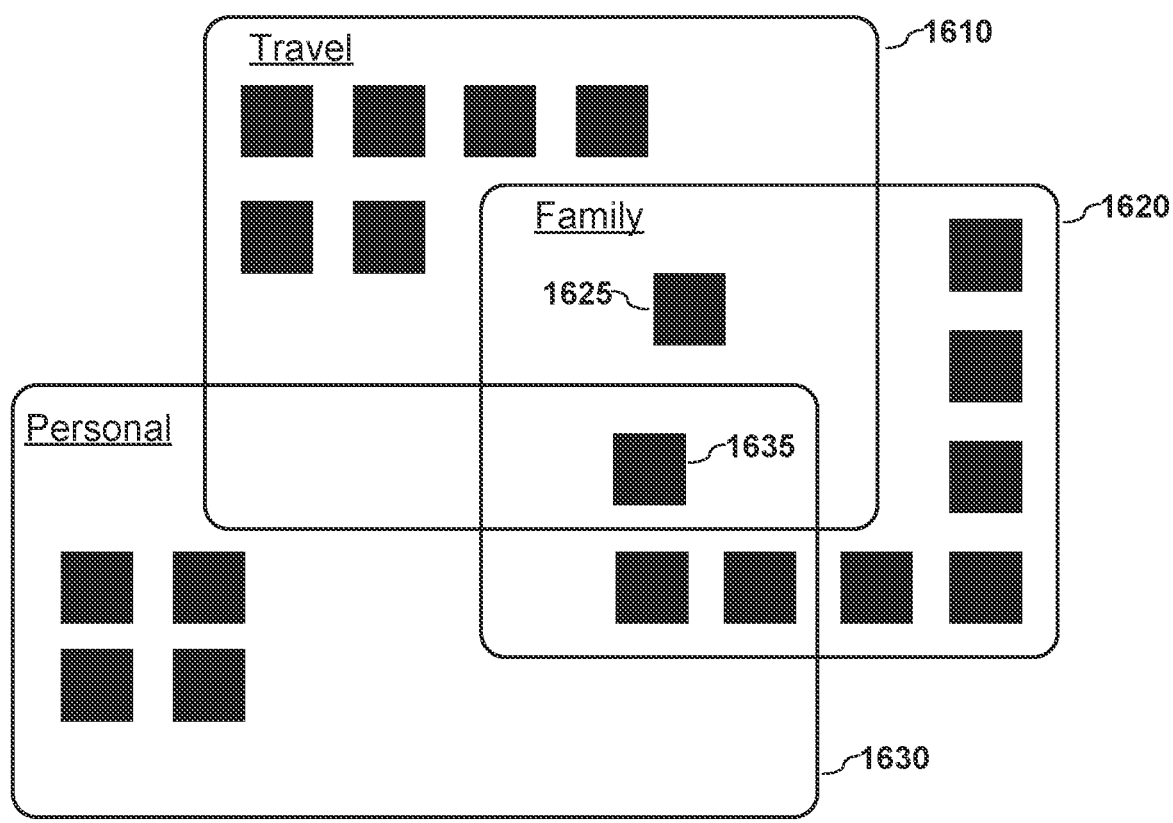
FIG. 16 graphically depicts, for purposes of illustration, a methodology of sharing content with third parties and/or generating views of content using metadata according to embodiments of the present disclosure.

Consider, by way of illustration and not limitation, the example shown in FIG. 16. FIG. 16 graphically depicts the metadata associated with content items according to embodiments of the present disclosure. The content items may be any electronic content such as pictures, sound files, links, text files, data files, video, calendar events, etc. As illustrated, the content items have been classified with tags "Travel" (1610), "Family" (1620), and "Personal" (1630). A user may associate "Travel, Family" with Third Party A, "Travel and Family" with Third Party B, and "Travel and Family but not Personal" with Third Party C. Assuming the logical operator OR, Third Party A would have access to all Travel items 1610 as well as all Family items 1620. Third Party B would have access to all items that are labeled with both Travel and Family, which are items 1625 and 1635; whereas, Third Party C would only have access to item 1625 because item 1635 is also labeled as Personal.

Figure 17:
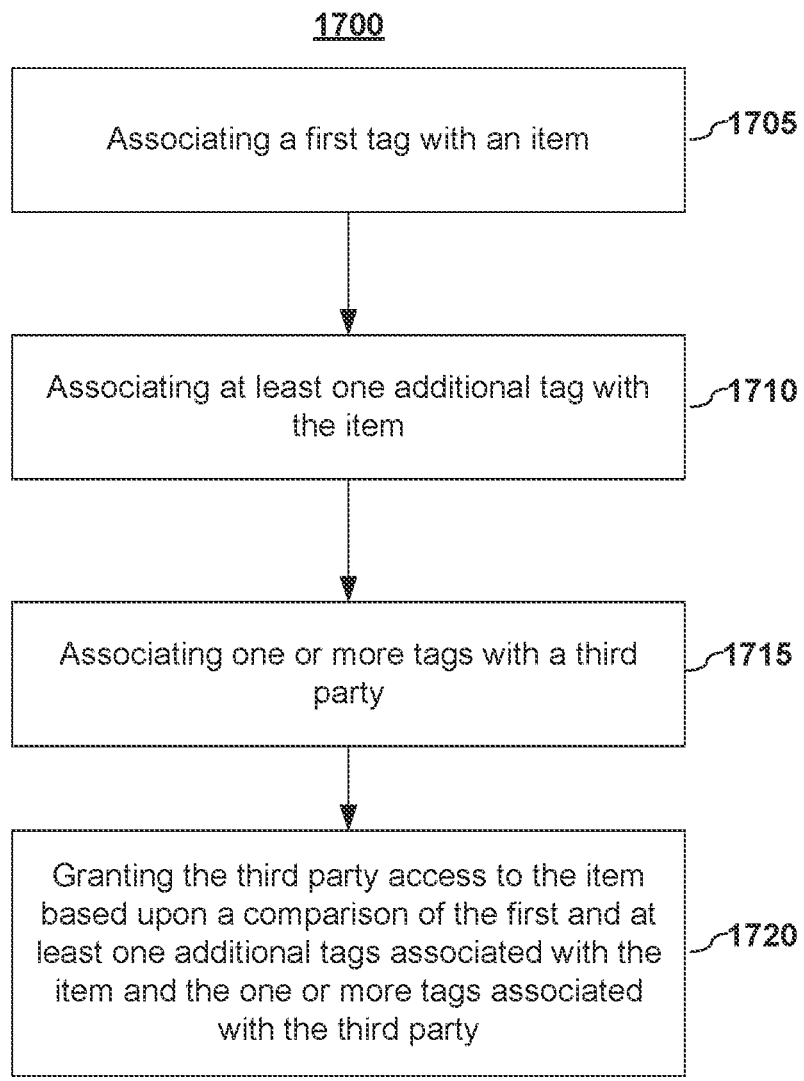
FIG. 17 depicts an alternative methodology for sharing content items with a third-party using metadata according to embodiments of the present disclosure.

FIG. 17 depicts an alternative methodology 1700 for sharing content items with a third-party using metadata according to embodiments of the present disclosure. A user can associate (1705) a first metadata descriptor with a content item.

At least one additional metadata descriptor is also associated (1710) with the content item, wherein the first metadata descriptor and the at least one additional metadata descriptor are concurrently associated with the content item. The phrase "concurrently associated" shall be construed to mean that there is at least some time period of overlap. Thus, concurrently associated shall include situations in which a first tag is associated and then one or more additional tags are subsequently associated. Thus, concurrently associated shall include situations in which tags are edited, added, or removed so long as at a time when access rights are determined for a third party a plurality of tags are associated. The user associates (1715) one or more tags with a third party, and the third party may be granted access (1720) to the content item based upon a comparison of the tags associated with the content item and the one or more tags associated with the third party. In one or more embodiments, the user may create the tag designations. In one or more embodiments, the tags may be selected from a pre-existing or pre-populated list. In one or more embodiments, a third party who is granted access to an item may share that item with one or more additional parties, including sharing the event with additional third parties using the same or different tag designations.

Figure 18:
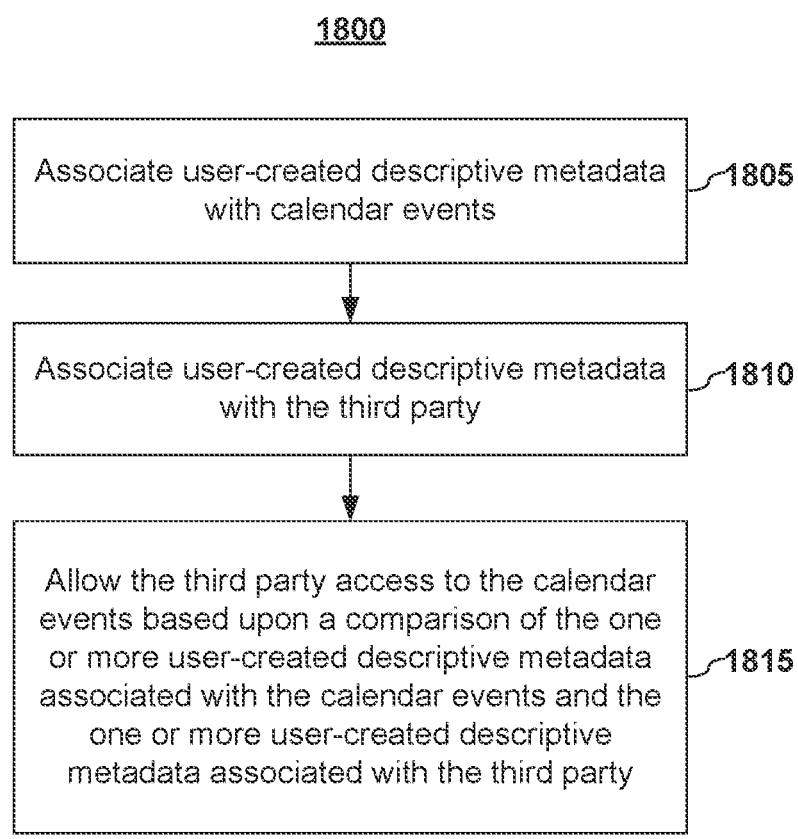
FIG. 18 depicts a methodology of sharing calendar events with third parties using metadata according to embodiments of the present disclosure.
Figure 19A:
FIG. 19A depicts, for purposes of illustration, a prior art method of sharing calendars, which required the creation of multiple calendars.

FIG. 18 depicts a methodology of sharing calendar events with third parties using metadata according to embodiments of the present disclosure. Currently, several software programs and web services allow users to create multiple calendars (each comprised of distinct events) that may then be shared with others or publicly distributed. That is, if an individual wishes to share events with co-workers, the individual must create a specific shared calendar, in this case a work calendar. If the individual wants one group of co-workers to see more or less of the work calendar events, a separate work calendar must be created for that group. Thus, sharing of calendar events involves the creation and maintaining of multiple, sometime largely duplicative, calendars. FIG. 19A depicts, for purposes of illustration, a previous method 1900 of sharing calendars, which requires the creation of multiple calendars. In the depicted example, to have a shared calendar for travel 1905, a shared calendar for personal items 1910, and a shared calendar for work 1915 requires having multiple calendars. A user might also have to maintain yet another calendar if the user wanted a single calendar with all of the events.

Figure 19B:
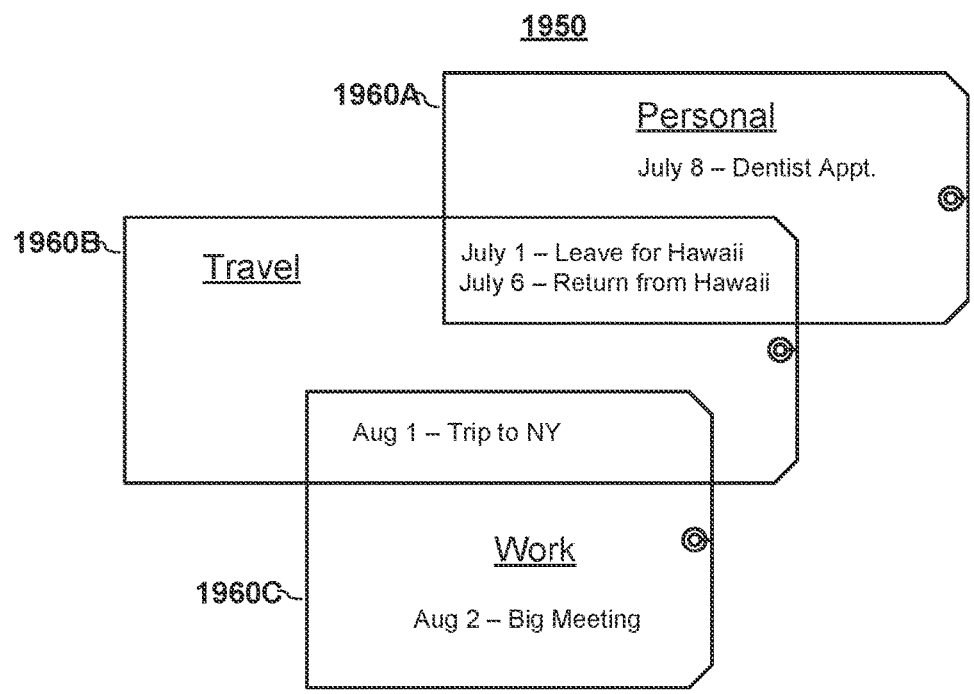
FIG. 19B graphically depicts, for purposes of illustration, a methodology of sharing calendar events using metadata according to embodiments of the present disclosure.

In contrast, embodiments of the present invention provide methods for segmenting items of information (events, photos, videos, links, text, etc.) so that they may be easily shared with others without having to duplicate efforts. FIG. 19B graphically depicts, for purposes of illustration, sharing of calendar items using metadata according to embodiments of the present disclosure. Instead of having to maintain multiple calendars, the user may maintain a single calendar 1950 and share events using metadata 1960 associated with the events.

Returning to FIG. 18, a user (e.g., User A) may append or otherwise associate metadata (1805) in the form of user-created descriptive tags with at least some of User A's events. For example, User A may enter or select the information displayed in Table 1.

TABLE 1

| Date | Event | Tag |
| --- | --- | --- |
| May 1 | Jen's Birthday | Personal, Birthdays |
| June 2 | Trip to Denver | Work, Travel |
| June 10 | Jack's Birthday | Birthday, Work |
| July 2-7 | Trip to Baltimore | Personal, Travel |

User A associates (1810) user-created tags with third parties that User A wishes to share events with. In one or more embodiments, content items may be shared actively with other users who have been made buddies to User A through an application service.

These third parties are allowed access (1815) to the calendar events based upon a comparison of the one or more user-created descriptive metadata associated with the calendar events and the one or more user-created descriptive metadata associated with the third party. For example, User A may allow User X to view all events with the tag: birthdays. User X would be able to view the events on May 1 ("Jen's Birthday") and June 10 ("Jack's Birthday"). User A may allow User Y to view all events with the tags: personal or travel. User Y would be able to view the events on May 1 ("Jen's Birthday"), June 2 ("Trip to Denver"), and July 2-7 ("Trip to Baltimore"). User A may instead allow User Y to view all events with the tags: personal and travel. In that case, User Y would only be able to view the calendar event July 2-7 ("Trip to Baltimore"). In one or more embodiments, a display of the shared events may appear on public facing obfuscated URL. In one or more embodiments, a specific URL may be created for each subset of content to be shared. In one or more embodiments, a third party who is granted access to an item may share that item with one or more additional parties, including sharing the event using a tag or tags designated by the third party.

Figure 20:
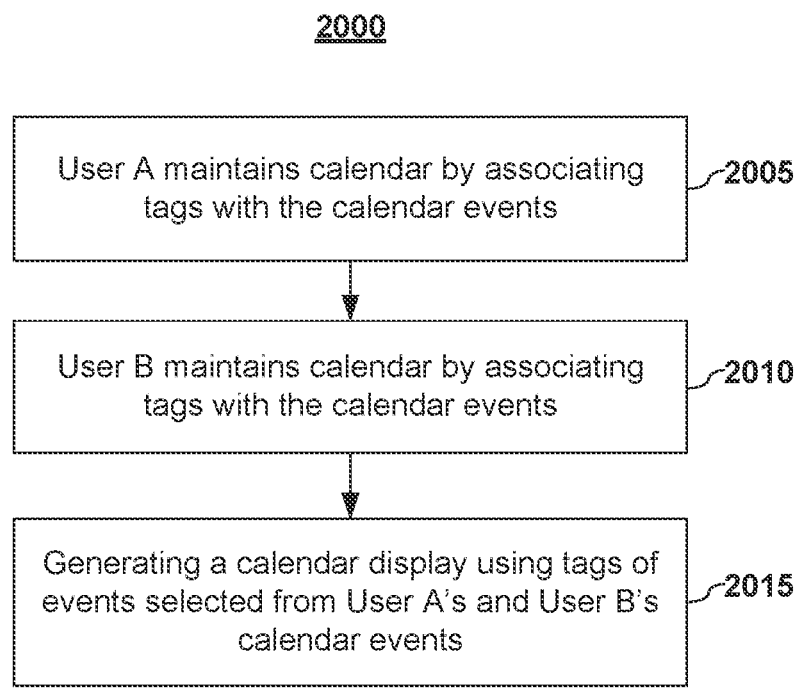
FIG. 20 depicts a methodology of collaboratively generating a shared calendar using metadata according to embodiments of the present disclosure.

As noted previously, typical shared calendars involved the creating of a separate, group calendar. It should be noted that another aspect of the present invention is its ability to easily create and maintain shared calendars by generating views of content based upon metadata. FIG. 20 depicts a method of collaboratively generating a shared calendar using metadata according to embodiments of the present disclosure. User A maintains a calendar. User A may maintain on the calendar only events that are associated with a specific group, or User A may maintain many different types of events. User A organizes these events by associating (2005) tags with the calendar events. Similarly, another user, User B, maintains a calendar with calendar events that are associated (2010) with tags. A display of the shared calendar can be generated (2015) using the tagged events selected from User A and User B. The display may be just the common events shared between User A and User B. In one or more embodiments, the shared events may appear at a shared location, such as at a specific URL address, where both User A and User B have access. Alternatively, additional third parties may also have access to the shared calendar display. In one or more embodiments, a third party who is granted access to an item may share that item with one or more additional parties, including sharing the event with additional third parties using the same or different tag designations.

In alternative embodiments, User A may request the generation of a display that has the shared event as well as other events for User A, which display may only be accessible by User A. Additional displays may be easily generated by changing the tags that are shared, the users that share, or both.

One skilled in the art shall recognize a number of advantages of the present invention. For example, there are several important efficiencies created using aspects of the present invention. In existing calendar interfaces, the multiple calendar paradigm would present a need to enter redundant events. For example, certain events to be shared with different audiences would have to be entered twice, once on each calendar. With sharing by tags, a single event may be shared with various audiences. Furthermore, sharing privileges may be easily changed at a user/buddy level or at a tag level by modifying the tags a user can view or by changing the tag associated with content. Also, as noted previously, more robust or complex sharing scenarios may be used by applying conditions or logical operations on the tags. Other advantages will be apparent to those skilled in the art.

2. Systems for Tag Sharing

Figure 21:
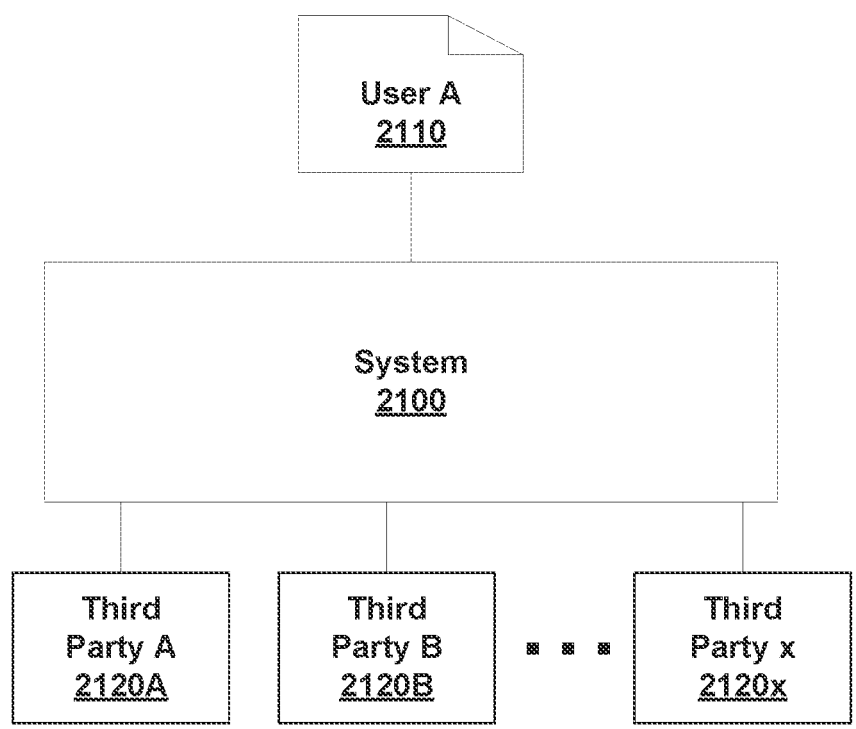
FIG. 21 graphically depicts a system for sharing content items with one or more third parties using metadata according to embodiments of the present disclosure.

FIG. 21 graphically depicts a system for sharing content items with one or more third parties using metadata according to embodiments of the present disclosure. As depicted in FIG. 21, a user 2110 interfaces with a system 2100 that facilitates the sharing of content items with one or more third parties 2120. In one or more embodiments, the user may interface with the system 2100 via a client computer 2110. In one or more embodiments, the system 2100 may be an Internet application or a networked application, wherein the user 2110 and/or the third parties 2120 (individuals and/or groups) with which the user shares content interface with the application through a browser or interface. It shall be noted that the specific implementations of the system is not critical to the present invention.

Consider, by way of illustration and not limitation, the following example. A user 2110 registers with a web service, such as 30Boxes.com, and keeps a calendar of events and other content on their system 2100. In one or more embodiments, a user may be an individual or group that uses the web services and may have an entry in a user database tied to one or more email addresses. A server of the web services 2100 may store the user database, which may also include profile information. A "buddy" may comprise a web services profile tied with a database entry to another profile. In one or more embodiments, a profile may indicate a relationship between the users, such as a trusted relationship, and may also contain metadata.

The user 2110 can have metadata associated with calendar events stored on the system 2100 and can also have metadata associated with one or more third party 2120. In one or more embodiments, metadata may be passed from a client (e.g., 2110) to a server (e.g., 2100) through one of several means (including, but not limited to, http GET, POST, email, SMS, IM, etc.) where it may be parsed and stored as a field. Third parties may interface with system 2100 to obtain access to the content of the user. In one or more embodiments, one or more of the third parties may access the content indirectly from system 2100. For example, system 2100 may have the content to which a third party has permissions forwarded to the third party via another service (e.g., email, instant message, forward to another application, etc.). Thus, it should be noted that a third party need not be a user of the services provided by system 2100 nor must they directly connect with the system 2100.

Figure 22:
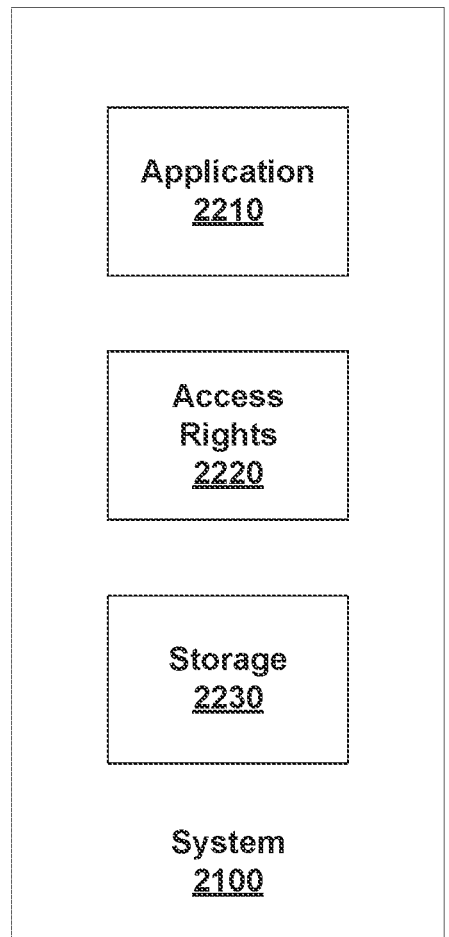
FIG. 22 depicts a function block diagram of a system for sharing content items with one or more third parties using metadata according to embodiments of the present disclosure.

FIG. 22 depicts a function block diagram of a system 2100 for sharing content items with one or more third parties using metadata according to embodiments of the present disclosure. Depicted in FIG. 22 is an application 2210, an access rights module 2220, and storage 2230. In one or more embodiments, application 2210 interfaces with the user to receive tags to be associated with content items and tags to be associated with third parties.

The content items and the tag information may be stored in storage 2230. In one or more embodiments, application 2210 may also facilitate the display or transfer of content items to the user and to third parties. Application 2210 may also represent a service or services that utilizes the content items as well as facilitates sharing. For example, application 2210 may be a calendaring application, photo sharing application, blog, or the like.

When a request to access content is received, access rights module 2220 performs a comparison to determine what content items are to be shared, if any. System 2100 may be implemented on a computing/instruction-executing device, such as, for example, depicted in FIG. 23.

C. Computing System Embodiments

FIG. 23 depicts a functional block diagram of an embodiment of an instruction-execution/computing device 2300 that may implement or embody embodiments of the present disclosure. As illustrated in FIG. 23, a processor 2302 executes software instructions and interacts with other system components. In one or more embodiments, processor 2302 may be a general-purpose processor such as an AMD processor, an INTEL x86 processor, a SUN MICROSYSTEMS SPARC, or a POWERPC compatible-CPU, or the processor may be an application specific processor or processors. A storage device 2304, coupled to processor 2302, provides long-term storage of data and software programs. Storage device 2304 may be a hard disk drive and/or another device capable of storing data, such as a computer-readable media (e.g., diskettes, tapes, compact disk, DVD, and the like) drive or a solid-state memory device. Storage device 2304 may hold programs, instructions, and/or data for use with processor 2302. In one or more embodiments, programs or instructions stored on or loaded from storage device 2304 may be loaded into memory 2306 and executed by processor 2302. In one or more embodiments, storage device 2304 holds programs or instructions for implementing an operating system on processor 2302. In one embodiment, possible operating systems include, but are not limited to, UNIX, AIX, LINUX, Microsoft Windows, and the Apple MAC OS. In one or more embodiments, the operating system executes on, and controls the operation of, the computing system 2300.

An addressable memory 2306, coupled to processor 2302, may be used to store data and software instructions to be executed by processor 2302. Memory 2306 may be, for example, firmware, read only memory (ROM), flash memory, non-volatile random access memory (NVRAM), random access memory (RAM), or any combination thereof. In one embodiment, memory 2306 stores a number of software objects, otherwise known as services, utilities, components, or modules. One skilled in the art will also recognize that storage 2304 and memory 2306 may be the same items and function in both capacities. In one or more embodiments, one or more of the components of FIGS. 11, 12, 13, and/or 22 may be modules stored in memory 2304, 2306 and executed by processor 2302.

In one or more embodiments, computing system 2300 provides the ability to communicate with other devices, other networks, or both. Computing system 2300 may include one or more network interfaces or adapters 2312, 2314 to communicatively couple computing system 2300 to other networks and devices. For example, computing system 2300 may include a network interface 2312, a communications port 2314, or both, each of which are communicatively coupled to processor 2302, and which may be used to couple computing system 2300 to other computer systems, networks, and devices.

In one or more embodiments, computing system 2300 may include one or more output devices 2308, coupled to processor 2302, to facilitate displaying graphics and text. Output devices 2308 may include, but are not limited to, a display, LCD screen, CRT monitor, printer, touch screen, or other device for displaying information. Computing system 2300 may also include a graphics adapter (not shown) to assist in displaying information or images on output device 2308.

One or more input devices 2310, coupled to processor 2302, may be used to facilitate user input. Input devices 2310 may include, but are not limited to, a pointing device, such as a mouse, trackball, or touchpad, and may also include a keyboard or keypad to input data or instructions into computing system 2300.

In one or more embodiments, computing system 2300 may receive input, whether through communications port 2314, network interface 2312, stored data in memory 2304/2306, or through an input device 2310, from a scanner, copier, facsimile machine, or other computing device.

It shall be understood that devices or components (or modules), that may be shown in block diagrams are illustrative of embodiments of the invention and are meant to avoid obscuring the invention. It shall also be understood that devices or components may be described as separate functional units, which may comprise sub-units, but those skilled in the art will recognize that the various devices or components, or portions thereof, may be physically and/or functionally divided into separate devices or components or may be physically and/or functionally integrated together, including integrating within a single system, device, or component.

Furthermore, connections between devices, systems, and components are not intended to be limited to direct connections. Rather, data between these items may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

It shall be noted that the present invention may be implemented in any instruction-execution/computing device or system (or group of devices or systems) capable of processing data, including without limitation, a general-purpose computer and a specific-purpose computer. One skilled in the art will recognize no computing system is critical to the practice of the present invention. The present invention may be implemented on or into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Embodiments of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall also be noted that embodiments of the present disclosure may further relate to computer products with a computer-readable medium or media that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

It shall also be noted that one advantage of the one box entry interface 305 is its compact size. The one box interface's 305 size allows it to be displayed with other items. Consider, for example, the one box entry interface 305 shown in FIG. 3. The entry interface 305 is readily displayed with the calendar 310 and with other information, such as for example, links to a "To Do" list 320, email or other communications interface 325, and contacts/buddies 330. A benefit of being able to display a single entry interface 305 with other information, such as the calendar, is that a user can readily reference the calendar 310 while entering a new event. This advantage is particularly evident when contrasted with the entry interface 100 depicted in FIG. 1, which consumes the entire screen view or is a separate screen view.

Interfaces, such as the one shown in FIG. 1, are disadvantaged in comparison to the present invention because, among other reasons, they create inefficiencies. First, as mentioned above, a user cannot readily reference the calendar while entering a new event. The user must typically toggle between screens displaying the calendar and the event entry interface, or complete or cancel the event entry and return to the calendar view. Neither approach is particularly satisfactory. Furthermore, because these entry interfaces typically appear on their own screen view/page view, delays may be added while these entry forms are displayed to a user. This delay may not be insubstantial in Internet applications where the entry interface 100 must be loaded as a separate page and then the calendar view must be reloaded upon completion or cancelling of the entry form 100. One skilled in the art shall recognize other advantages of the present invention.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the spirit and scope of that disclosed herein.

APPENDIX A

| Format/Example | Comments |
|---|---|
| event date time (notes) | all sorts of combinations will work for |
| lunch thursday 1pm (cafe centro) | dates and times: december 10, 9-10am, next tuesday, etc. |
| hyperlink | URLs will be added to the notes for an |
| dinner http://slanteddoor.com | event and linked |
| [location] | square brackets create locations that |
| meeting thursday [164 south park, san francisco, ca] | link to a map application and may also provide weather for that city |
| [home\|location] | if a user set his home or work locale in |
| meeting mar4 [home\|164 south park, san francisco, ca] | Settings, then he will get directions from home (or work) to the location |
| +emailOne +emailTwo ... +emailN | sends out invitations to join the event to |
| party 8pm +joe@aol.com +jen@gmail.com | these email addresses |
| +email! | creates an "urgent" invitation and sends |
| bowling 10pm +joe@aol.com! | a text message to the person invited |
| tag tagOne tag tagTwo ... tag tagN | tag followed by a space brings a drop- |
| trip to hawaii jan3-8 tag personal tag travel | down menu of existing tags (or lets a user add a new one) -- events can have multiple tags |
| tag color | "easter egg" that will apply a font color |
| dentist appointment tag blue | (e.g., blue, navy, maroon, purple, green red, teal, magenta, olive, lime, orange, aqua and yellow) |
| repeat interval | repeat space provides a drop-down |
| yoga repeat every Thursday | with repeat options |

-continued

APPENDIX A

| Format/Example | Comments |
| --- | --- |
| repeat interval until date | gives repeats an end date |
| pay heating bill repeat monthly until 6/1 | |
| * | an asterisk assigns the tag "important" to an event, puts a star next to it and puts it at the top of the display |
| * big meeting | |
| private | creates an event that is only visible to the user even if the user shares his calendar |
| doctor's appt. private | |
| remind in timePeriod | remind space gives the user a drop-down for reminder intervals so the user can be alerted (by email or SMS) of an event before it happens |
| call with bob remind in 15 minutes | |
| todo myToDoItem | uses the one box to add an item to the user's To Do list |
| todo do my laundry | |

We claim:

1. A computer-implemented method for facilitating entry of information into an application, the method comprising:
   providing a user interface for the application, in which the user interface comprising an input region for data entry that receives input from a user;
   parsing input data comprising text, which is received from the user via the user interface:
   responsive to identifying a readily-identified text string comprising one or more characters in the text received via the user interface, providing, to the user via a display device, a prompt interface that facilitates entry of data in the user interface; and
   responsive to the user selecting or entering data in the prompt interface, altering data in the user interface based upon the data selected or entered by the user via the prompt interface.

2. The computer-implemented method of claim 1 wherein the application provides messaging capabilities.

3. The computer-implemented method of claim 1 wherein the step of altering data in the user interface based upon the data selected or entered by the user via the prompt interface comprises:
   altering data in the input region of the user interface based upon the data selected or entered by the user via the prompt interface.

4. The computer-implemented method of claim 1 further comprising:
   allowing the user to edit the altered data in the input region before the altered data is entered into the application via the input region.

5. The computer-implemented method of claim 1 wherein the prompt interface comprises one or more pre-populated sets of data.

6. The computer-implemented method of claim 5 wherein at least one of the one or more pre-populated sets of data is related to the readily-identified text string.

7. The computer-implemented method of claim 1 wherein the step of parsing input data comprising text, which is received from the user via the user interface, comprises:
   parsing the input data as it is input by the user.

8. The computer-implemented method of claim 1 wherein the step of responsive to the user selecting or entering data in the prompt interface, altering data in the user interface based upon the data selected or entered by the user via the prompt interface further comprises:
   removing the prompt interface following the user selecting or entering data in the prompt interface.

9. A computer-implemented method comprising:
   examining text character-by-character after each character of the text is input into a first input region of a user interface of an application;
   responsive to identifying a text string comprising one or more characters in the first input region that correspond to a rule or action that initiates display of a second input region, providing, to the user via a display device, the second input region that facilitates entry of data; and
   responsive to the user selecting or entering data in the second input region, altering data in the user interface based upon the data selected or entered via the second input region.

10. The computer-implemented method of claim 9 wherein the step of altering data in the user interface based upon the data selected or entered via the second input region comprises:
    altering data in the first input region based upon the data selected or entered via the second input region.

11. The computer-implemented method of claim 9 wherein the second input region comprises one or more pre-populated sets of data.

12. The computer-implemented method of claim 11 wherein at least one of the one or more pre-populated sets of data is related to the text string.

13. The computer-implemented method of claim 9 wherein the step of examining character-by-character text after it is input into a first input region of a user interface of an application, comprises:
    parsing the input data as it is input by the user.

14. The computer-implemented method of claim 9 wherein the step of responsive to the user selecting or entering data in the second input region further comprises:
    removing from being displayed the second input region following the user selecting or entering data in the second input region.

15. A computer-implemented method comprising:
    examining text received by an application, which comprises a first input region that facilitates receiving input from a user;
    responsive to identifying a text string comprising one or more characters that correspond to a rule or action, causing content in a second input region that is related to the text string to be displayed; and
    responsive to the user selecting or entering data in the second input region, altering data in the first input region related to the data selected or entered via the second input region.

16. The computer-implemented method of claim 15 wherein the step of altering data in the first input region related to the data selected or entered via the second input region comprises:
- altering data in the first input region based upon the data selected or entered via the second input region.

17. The computer-implemented method of claim 15 wherein the second input region comprises one or more pre-populated options.

18. The computer-implemented method of claim 17 wherein at least one or more of the pre-populated options is related to the text string.

19. The computer-implemented method of claim 15 further comprising:
- examining text character-by-character after each character of the text is input into the first input region of the application; and
- responsive to identifying a text string comprising one or more characters in the first input region that correspond to a rule or action, providing to the user via a second input region, one or more options.

20. The computer-implemented method of claim 19 wherein the one or more options comprises:
- causing an action to be performed for a different application.

* * * * *